(12) United States Patent
Schroeder

(10) Patent No.: US 9,787,559 B1
(45) Date of Patent: Oct. 10, 2017

(54) END-TO-END MONITORING OF OVERLAY NETWORKS PROVIDING VIRTUALIZED NETWORK SERVICES

(71) Applicant: Juniper Networks, Inc., Sunnyvale, CA (US)

(72) Inventor: Hartmut Schroeder, Duisburg (DE)

(73) Assignee: Juniper Networks, Inc., Sunnyvale, CA (US)

( * ) Notice: Subject to any disclaimer, the term of this patent is extended or adjusted under 35 U.S.C. 154(b) by 171 days.

(21) Appl. No.: 14/228,874

(22) Filed: Mar. 28, 2014

(51) Int. Cl.
*H04L 12/26* (2006.01)
*H04L 12/24* (2006.01)

(52) U.S. Cl.
CPC ........ *H04L 43/067* (2013.01); *H04L 41/5038* (2013.01); *H04L 43/106* (2013.01); *H04L 43/12* (2013.01)

(58) Field of Classification Search
CPC ....... H04L 12/56; H04L 12/26; H04L 43/067; H04L 43/12; H04L 43/106; H04L 41/5038
See application file for complete search history.

(56) References Cited

U.S. PATENT DOCUMENTS

| | | | |
|---|---|---|---|
| 6,760,328 B1 | 7/2004 | Ofek | |
| 7,042,838 B1 | 5/2006 | Shand et al. | |
| 7,184,437 B1 | 2/2007 | Cole et al. | |
| 7,519,006 B1 | 4/2009 | Wing | |
| 7,606,887 B1* | 10/2009 | Stewart ............... | H04L 41/5003 709/223 |
| 7,937,492 B1 | 5/2011 | Kompella et al. | |
| 8,339,959 B1 | 12/2012 | Moisand et al. | |
| 2007/0195797 A1 | 8/2007 | Patel et al. | |
| 2007/0223388 A1* | 9/2007 | Arad ..................... | H04L 1/24 370/252 |
| 2008/0044181 A1 | 2/2008 | Sindhu | |
| 2008/0267073 A1* | 10/2008 | Thaler ................. | H04L 12/2697 370/236 |
| 2009/0037713 A1* | 2/2009 | Khalid ................ | H04L 12/4633 713/1 |
| 2010/0061242 A1 | 3/2010 | Sindhu et al. | |

(Continued)

FOREIGN PATENT DOCUMENTS

WO    2013184846 A1    12/2013

OTHER PUBLICATIONS

Bocci et al., "MPLS Generic Associated Channel," RFC 5586, The IETF Trust, Jun. 2009, 19 pp.

(Continued)

*Primary Examiner* — Christopher Grey
(74) *Attorney, Agent, or Firm* — Shumaker & Sieffert, P.A.

(57) ABSTRACT

In one example, a network device external to a services complex injects a plurality of probe packets along service chains provided by the services complex, wherein each of the plurality of probe packets includes a first timestamp indicating a time at which the network device sent the respective probe packet. Each of a plurality of service nodes in the services complex modifies each of the plurality of probe packets by inserting a respective second timestamp indicating a respective time at which the respective service node processed the respective one of the plurality of probe packets. An analytics device aggregates probe report information received from each of the plurality of service nodes to determine one or more path monitoring metrics.

13 Claims, 10 Drawing Sheets

(56) References Cited

U.S. PATENT DOCUMENTS

| | | | |
|---|---|---|---|
| 2011/0006818 A1* | 1/2011 | Takagi | H03L 7/085 327/147 |
| 2011/0063988 A1* | 3/2011 | Lee | H04L 41/5009 370/252 |
| 2011/0206055 A1 | 8/2011 | Leong | |
| 2012/0011170 A1 | 1/2012 | Elad et al. | |
| 2012/0207161 A1 | 8/2012 | Uppalli et al. | |
| 2012/0230186 A1 | 9/2012 | Lee et al. | |
| 2012/0257631 A1 | 10/2012 | Nguyen | |
| 2012/0311132 A1* | 12/2012 | Tychon | H04L 41/5038 709/224 |
| 2013/0100816 A1 | 4/2013 | Bergamasco et al. | |
| 2013/0294243 A1 | 11/2013 | Wiley et al. | |
| 2013/0297774 A1* | 11/2013 | Pope | H04L 47/286 709/224 |
| 2014/0192804 A1* | 7/2014 | Ghanwani | H04L 49/70 370/390 |

OTHER PUBLICATIONS

Bradner et al., "Benchmarking Methodology for Network Interconnect Devices," RFC 2544, The Internet Society, 1999, 31 pp.

Conta et al., "Internet Control Message Protocol (ICMPv6) for the Internet Protocol Version 6 (IPv6) Specification," RFC 4443, The Internet Society, Mar. 2006, 24 pp.

ITU-T Y.1564, Series Y: Global Information Infrastructure, Internet Protocol Aspects and Next-Generation Networks, Internet protocol aspects—Quality of service and network performance, Ethernet service activation test methodology, The International Telecommunication Union, Mar. 2011, 38 pp.

ITU-T Y.1731, Series Y: Global Information Infrastructure, Internet Protocol Aspects and Next-Generation Networks, Internet protocol aspects—Operation administration and maintenance, OAM functions and mechanisms for Ethernet based networks, The International Telecommunication Union, May 2006, 80 pp.

Katz et al., "Bidirectional Forwarding Detection (BFD)," RFC 5880, The IETF Trust, Jun. 2010, 49 pp.

Kompella et al., "Detecting Multi-Protocol Label Switched (MPLS) Date Plane Failures," RFC 4379, The Internet Society, Feb. 2006, 50 pp.

Nadeau et al., "Pseudowire Virtual Circuit Connectivity Verification (VCCV): A Control Channel for Pseudowires" RFC 5085, The IETF Trust, Dec. 2007, 30 pp.

Niu et al., "Service Chaining Header and Service Chaining Mechanism," Internet Draft, The IETF Trust, Jul. 15, 2013, 9 pp.

Postel, "Internet Control Message Protocol—DARPA Internet Program Protocol Specification," RFC 792, Information Sciences Institute, Sep. 1981, 21 pp.

Saxena et al., "Detecting Data-Plane Failures in Point-to-Multipoint MPLS—Extensions to LSP Ping," RFC 6425, The IETF Trust, Nov. 2011, 28 pp.

Hopps et al., "Analysis of an Equal-Cost Multi-Path Algorithm," RFC 2992, Nov. 2000, 8 pp.

U.S. Appl. No. 13/840,657, filed Mar. 15, 2013, entitled "Finding Latency Through a Physical Network in a Virtualized Network,".

* cited by examiner

END-TO-END MONITORING OF OVERLAY NETWORKS PROVIDING VIRTUALIZED NETWORK SERVICES

TECHNICAL FIELD

The disclosure relates to communication networks.

BACKGROUND

A data center is a specialized facility that provides data serving and backup as well as other network-based services for subscribers and other entities. For example, a data center may comprise a facility that hosts applications and services for subscribers, i.e., customers of the data center. A data center in its most simple form may consist of a single facility that hosts all of the infrastructure equipment, such as networking and storage systems, servers, redundant power supplies, and environmental controls.

Customers using data centers want assurances about what services the customers are receiving relative to service level agreements (SLAs) for which the customers are paying. Information about the level and quality of services may be less transparent to customers in the data center environment.

SUMMARY

In general, techniques are described for providing network monitoring of forwarding paths that extend through overlay tunnels for data centers. In general, the disclosure provides techniques for determining latency, jitter and packet loss in a network that includes a number of physical and virtual network elements over which packets travel. In a virtual network architecture, information regarding latency of any particular flow, i.e., the time it takes for a packet to travel from one network device (e.g., server) to another network device via a particular path of switches and connectors, may not be readily available to the virtual network.

As described herein, a network device at an edge of an access network or a data center network can output probe packets that are transported through overlay tunnels to virtual routers in the data center and back to the network device or another network device. In response to receiving the probe packets, one or more network devices, virtual routers, and applications along the forwarding path of the probe packets can provide probe reporting information to a central analytics device, and may alternatively or additionally modify the probe packets, such as by adding timestamps. The central analytics device can compile and analyze the probe reporting information and present report information to customers about latency, jitter, packet-loss and any problems in the data center, as it may pertain to SLAs.

In one example, a method includes injecting, by a network device external to a services complex, a plurality of probe packets along service chains provided by the services complex, wherein each of the plurality of probe packets includes a first timestamp indicating a time at which the network device sent the respective probe packet. The method also includes, by one or more of a plurality of service nodes in the services complex, modifying each of the plurality of probe packets by inserting a respective second timestamp indicating a respective time at which the respective service node processed the respective one of the plurality of probe packets, and aggregating probe report information received from each of the plurality of service nodes to determine one or more path monitoring metrics.

In another example, a controller network device includes a control unit comprising one or more processors, and a probe module executing on the one or more processors to provide probe configuration information to a router external to a services complex, wherein the probe configuration information specifies information for injecting a plurality of probe packets along service chains provided by the services complex, wherein each of the plurality of probe packets includes a first timestamp indicating a time at which the router sent the respective probe packet. The controller network device can also include an analytics machine or daemon configured to aggregate probe report information received from each of the plurality of service nodes to determine one or more path monitoring metrics.

In another example, a system includes a services complex comprising a plurality of service nodes, a border router external to the services complex, wherein the border router is configured to inject a plurality of probe packets along service chains provided by the service complex, wherein each of the plurality of probe packets includes a first timestamp indicating a time at which the border router sent the respective probe packet, wherein one or more of the plurality of service nodes is configured to modify each of the plurality of probe packets by inserting a respective second timestamp indicating a respective time at which the respective service node processed the respective one of the plurality of probe packets, and a central controller device configured to aggregate probe report information received from each of the plurality of service nodes to determine one or more path monitoring metrics.

In a further example a method includes receiving, by a network device comprising a plurality of service node virtual machines for application of network services, a probe packet having a timestamp field, and, by a virtual router component of the network device, modifying the probe packet by adding a timestamp entry to the timestamp field indicating a time at which the virtual router component processed the probe packet. The method also includes forwarding the modified probe packet to one of the plurality of service node virtual machines for application of a network service, and, in response to receiving the probe packet, sending, to an analytics device, a message reporting contents of the timestamp field of at least one of the received probe packet or the modified probe packet.

The techniques of this disclosure may provide one or more advantages. For example, using a collection of information from multiple probe packets, a virtual network controller can identify places in the physical network that are slow or where bottlenecks in traffic are occurring. Such a bottleneck may be indicative of a problem with the physical network, such as, for example, a deteriorated cable. Identifying such problems in the physical network without having to run specific testing on each of the components of the network may save time and money, and can help ensure that the network performs optimally and without interruption.

As another example, the techniques of this disclosure can be used to provide service level agreement (SLA) monitoring to a data center. As traffic is sent through service applications in the data center, the techniques of this disclosure can provide application performance monitoring and proactive-alert functions for the operator providing the service. The operator can be provided with proactive alarms indicating a problem, allowing the operator to be able to manually or automatic change the service they provide. For example, the proactive alarms can allow service providers to launch a new service virtual machine as needed if load or performance issues are causing problems with an existing service virtual machine.

The techniques of this disclosure can provide visibility on monitoring metrics such as healthchecks, performance loss, jitter, and latency without requiring action on the subscriber side or server side. Devices in the server provider network can perform the probe distribution and setup along with the reporting.

The details of one or more examples are set forth in the accompanying drawings and the description below. Other features, objects, and advantages will be apparent from the description and drawings, and from the claims.

BRIEF DESCRIPTION OF DRAWINGS

Like reference characters denote like elements throughout the figures and text.

DETAILED DESCRIPTION

Figure 1:
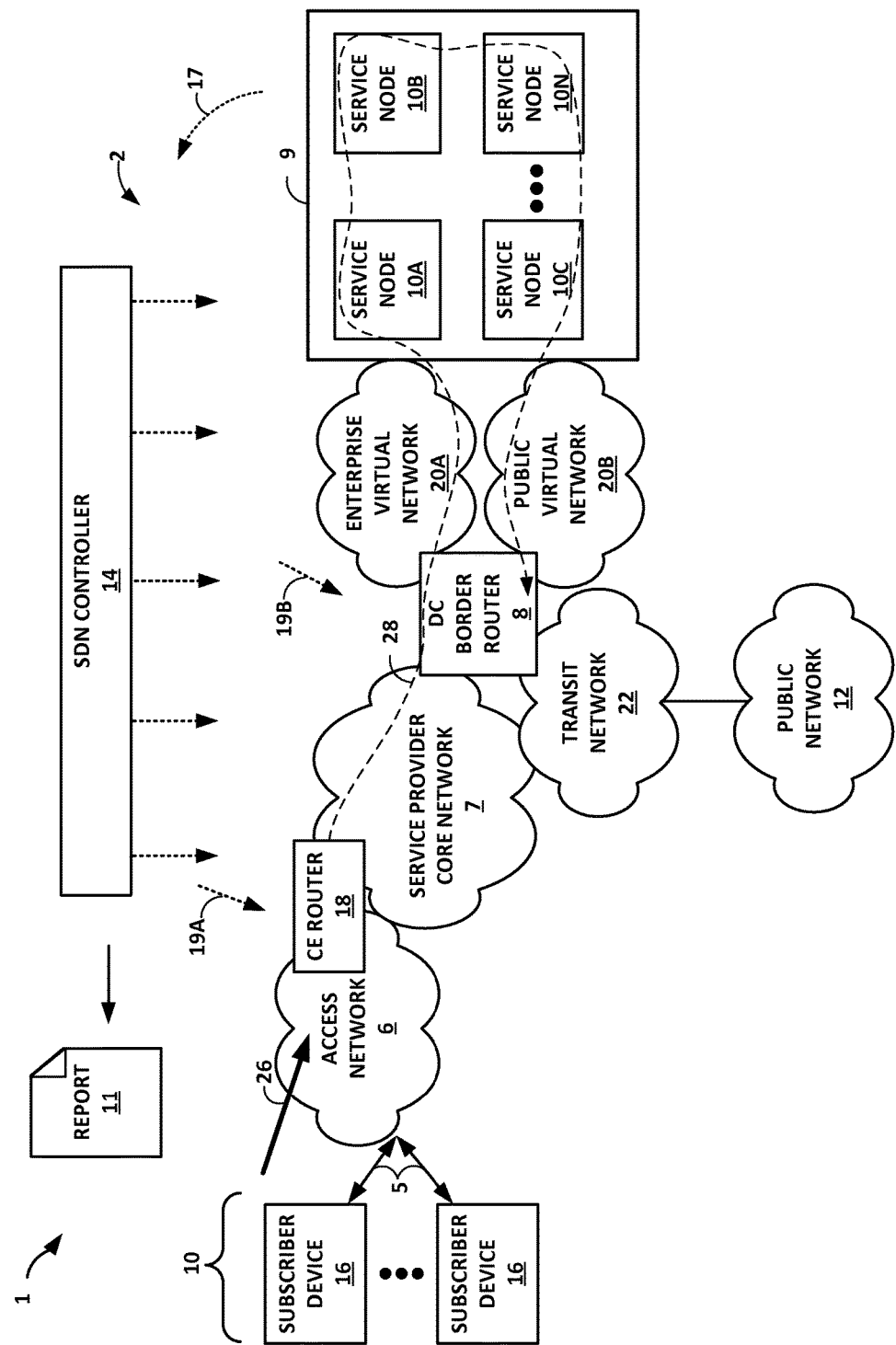
FIG. 1 is a block diagram illustrating an example network system in accordance with techniques described herein.

FIG. 1 is a block diagram illustrating an example network system 1 in accordance with techniques described herein. The example network system 1 of FIG. 1 includes a service provider network 2 that operates as a private network to provide packet-based network services to subscriber devices 16. That is, service provider network 2 provides authentication and establishment of network access for subscriber devices 16 such that a subscriber device may begin exchanging data packets with public network 12, which may be an internal or external packet-based network such as the Internet.

In the example of FIG. 1, service provider network 2 comprises access network 6 ("access network 6") that provides connectivity to public network 12 via service provider core network 7 and data center (DC) border router 8. Service provider core network 7 and public network 12 provide packet-based services that are available for request and use by subscriber devices subscriber devices 16. As examples, core network 7 and/or public network 12 may provide, for example, bulk data delivery, voice over Internet protocol (VoIP), Internet Protocol television (IPTV), Short Messaging Service (SMS), Wireless Application Protocol (WAP) service, or customer-specific application services. Public network 12 may comprise, for instance, a local area network (LAN), a wide area network (WAN), the Internet, a virtual LAN (VLAN), an enterprise LAN, a layer 3 virtual private network (VPN), an Internet Protocol (IP) intranet operated by the service provider that operates access network 6, an enterprise IP network, or some combination thereof. In various embodiments, public network 12 is connected to a public WAN, the Internet, or to other networks. Public network 12 executes one or more packet data protocols (PDPs), such as IP (IPv4 and/or IPv6), X.25 or Point-to-Point Protocol (PPP), to enable packet-based transport of public network 12 services.

Subscriber devices 16 can connect to DC border router 8 via access network 6 to receive connectivity to subscriber services for applications hosted by Service nodes 10A-10N. A subscriber may represent, for instance, an enterprise, a residential subscriber, or a mobile subscriber. Subscriber devices 16 may be, for example, personal computers, laptop computers or other types of computing device associated with subscribers. In addition, subscriber devices 16 may comprise mobile devices that access the data services of service provider network 2 via a radio access network (RAN) (not shown). Example mobile subscriber devices include mobile telephones, laptop or desktop computers having, e.g., a 3G wireless card, wireless-capable netbooks, video game devices, pagers, smart phones, personal data assistants (PDAs) or the like.

Each of subscriber devices 16 may run a variety of software applications, such as word processing and other office support software, web browsing software, software to support voice calls, video games, videoconferencing, and email, among others. Subscriber devices 16 connect to access network 6 via access links 5 that comprise wired and/or wireless communication link. The term "communication link," as used herein, comprises any form of transport medium, wired or wireless, and can include intermediate nodes such as network devices. Each of access links 5 may comprise, for instance, aspects of an asymmetric DSL network, WiMAX, a T-1 line, an Integrated Service Digital Network (ISDN), wired Ethernet, or a cellular radio link.

A network service provider operates, or in some cases leases, elements of access network 6 to provide packet transport between subscriber devices 16 and DC border router 8. Access network 6 represents a network that aggregates data traffic from one or more subscribers for transport to/from service provider core network 7 of the service provider. Access network 6 includes network nodes that execute communication protocols to transport control and user data to facilitate communication between subscriber devices 16 and DC border router 8. Access network 6 may include a broadband access network, network, a wireless LAN, a public switched telephone network (PSTN), a customer premises equipment (CPE) network, or other type of access network, and may include or otherwise provide connectivity for cellular access networks, such as a radio access network (RAN) (not shown). Examples of include networks conforming to a Universal Mobile Telecommunications System (UMTS) architecture, an evolution of UMTS referred to as Long Term Evolution (LTE), mobile IP standardized by the Internet Engineering Task Force (IETF), as well as other standards proposed by the $3^{rd}$ Generation Partnership Project (3GPP), $3^{rd}$ Generation Partnership Project 2 (3GGP/2) and the Worldwide Interoperability for Microwave Access (WiMAX) forum. CE router 18 may be a customer edge router, a provider edge router, or other network device.

Service provider core network 7 (hereinafter, "core network 7") offers packet-based connectivity to subscriber devices 16 attached to access network 6 for accessing public network 12 (e.g., the Internet). Core network 7 may represent a public network that is owned and operated by a service provider to interconnect a plurality of networks, which may include access network 6. Core network 7 may implement Multi-Protocol Label Switching (MPLS) forwarding and in such instances may be referred to as an MPLS network or MPLS backbone. In some instances, core network 7 represents a plurality of interconnected autonomous systems, such as the Internet, that offers services from one or more service providers. Public network 12 may represent the Internet. Public network 12 may represent an edge network coupled to core network 7, e.g., by a customer edge device such as customer edge switch or router. Public network 12 may include a data center. DC border router 8 can send and receive packets on forwarding path 28 via enterprise virtual network 20A and public virtual network 20B, and DC border router 8 can forward packets to public network 12 via transit network 22.

In examples of network 2 that include a wireline/broadband access network, DC border router 8 may represent a Broadband Network Gateway (BNG), a Broadband Remote Access Server (BRAS), MPLS Provider Edge (PE) router, core router or gateway, or a Cable Modem Termination System (CMTS), for instance. In examples of network 2 that include a cellular access network as access network 6, data center (DC) border router 8 may represent a mobile gateway, for example, a Gateway General Packet Radio Service (GPRS) Serving Node (GGSN), an Access Gateway (aGW), or a Packet Data Network (PDN) Gateway (PGW). In other examples, the functionality described with respect to DC border router 8 may be implemented in a switch, service card or other network element or component. In some examples, DC border router 8 may itself be a service node.

A network service provider that administers at least parts of network 2 typically offers services to subscribers associated with devices, e.g., subscriber devices 16, that access the service provider network. Services offered may include, for example, traditional Internet access, Voice-over-Internet Protocol (VoIP), video and multimedia services, and security services. As described above with respect to access network 6, core network 7 may support multiple types of access network infrastructures that connect to service provider network access gateways to provide access to the offered services. In some instances, network system may include subscriber devices 16 that attach to multiple different access networks 6 having varying architectures.

In general, any one or more of subscriber devices 16 may request authorization and data services by sending a session request to a gateway device such as CE router 18 or data center border router 8. In turn, CE router 18 may access a central server (not shown) such as an Authentication, Authorization and Accounting (AAA) server to authenticate the subscriber device requesting network access. Once authenticated, any of subscriber devices 16 may send subscriber data traffic toward service provider core network 7 in order to access and receive services provided by public network 12, and such packets may traverse DC border router 8 as part of at least one packet flow. In some examples, CE router 18 can forward all authenticated subscriber traffic to public network 12, and DC border router 8 or SDN controller 14 can dynamically steer particular subscriber traffic to services complex 9 if the subscriber traffic requires services on the service nodes 10. Applications (e.g., service applications) to be applied to the subscriber traffic may be hosted on service nodes 10.

Flows 26 illustrated in FIG. 1 represent one or more upstream packet flows from any one or more subscriber devices 16 and directed to public network 12. The term "packet flow," "traffic flow," or simply "flow" refers to a set of packets originating from a particular source device and sent to a particular destination device. A single flow of packets, in either the upstream (sourced by one of subscriber devices 16) or downstream (destined for one of subscriber devices 16) direction, may be identified by the 5-tuple: <source network address, destination network address, source port, destination port, protocol>, for example. This 5-tuple generally identifies a packet flow to which a received packet corresponds. An n-tuple refers to any n items drawn from the 5-tuple. For example, a 2-tuple for a packet may refer to the combination of <source network address, destination network address> or <source network address, source port> for the packet. Moreover, a subscriber device 16 may originate multiple packet flows upon authenticating to service provider network 2 and establishing a communication session for receiving data services.

As described herein, service provider network also includes a data center 9 having a cluster of service nodes 10A-10N ("service nodes 10") that provide an execution environment for the mostly virtualized network services. In some examples, each of service nodes 10 represents a service instance. Each of service nodes 10 may apply one or more services. As examples, service nodes 10 may apply firewall and security services, carrier grade network address translation (CG-NAT), media optimization (voice/video), IPSec/VPN services, deep packet inspection (DPI), HTTP filtering, counting, accounting, charging, and/or load balancing of packet flows, or other types of services applied to network traffic.

Although illustrated as part of a services complex 9, which may represent a data center, service nodes 10 may, for instance, be network devices coupled by one or more switches or virtual switches of core network 7. In one example, each of service nodes 10 may run as virtual machines in a virtual compute environment. Moreover, the compute environment may comprise a scalable cluster of general computing devices, such as x86 processor-based servers. As another example, service nodes 10 may comprise a combination of general purpose computing devices and special purpose appliances. As virtualized, individual network services provided by service nodes 10 can scale just as in a modern data center, through the allocation of virtualized memory, processor utilization, storage and network policies, as well as horizontally by adding additional load-balanced virtual machines. In other examples, service nodes 10 may be a gateway device or other router. In further examples, the functionality described with respect to each of service nodes 10A-10N may be implemented in a switch, service card or other network element or component.

As shown in FIG. 1, DC border router 8 can steer individual subscriber packet flows 26 through defined sets of services provided by service nodes 10. That is, in some examples, each subscriber packet flow may be forwarded through a particular ordered combination of services provided by service nodes 10, each ordered set being referred to herein as a "service chain." In the example of FIG. 1, subscriber packet flows 26 may be directed along a service chain that includes any of service nodes 10. A particular service node 10 may support multiple service chains.

Once processed at a terminal node of the service chain, i.e., the last service node 10 to apply services to packets flowing along a particular service path, the terminal node may direct the traffic back to DC border router 8 for further processing and/or forwarding to public network 12. For example, traffic engineered service paths may start and terminate with DC border router 8.

Whereas a "service chain" defines one or more services to be applied in a particular order to provide a composite service for application to packet flows bound to the service chain, a "service tunnel" or "service path" refers to a logical and/or physical path taken by packet flows processed by a service chain along with the forwarding state for forwarding packet flows according to the service chain ordering. Each service chain may be associated with a respective service tunnel, and packet flows associated with each subscriber device 16 flow along service tunnels in accordance with a service profile associated with the respective subscriber. For example, a given subscriber may be associated with a particular service profile, which in turn is mapped to a service tunnel associated with a particular service chain. Similarly, another subscriber may be associated with a different service profile, which in turn is mapped to a service tunnel associated with a different service chain. In some examples, DC border router 8 or CE router 18 may, after CE router 18 has authenticated and established access sessions for the subscribers, direct packet flows for the subscribers along the appropriate service tunnels, thereby causing data center 9 to apply the requisite ordered services for the given subscriber. In some examples, SDN controller 14 may also provide a forwarding rule set to CE router or DC border router 8 for managing the forwarding path. In some examples, SDN controller 14 manages the forwarding path through all elements in the data center of services complex 9, starting at DC border router 8.

In some examples, service nodes 10 may implement service chains using internally configured forwarding state that directs packets of the packet flow long the service chains for processing according to the identified set of service nodes 10. Such forwarding state may specify tunnel interfaces for tunneling between service nodes 10 using network tunnels such as Internet Protocol (IP) or Generic Route Encapsulation (GRE) tunnels, Network Virtualization using GRE (NVGRE), or by using Virtual Local Area Networks (VLANs), Virtual Extensible LANs (VXLANs), Multiprotocol Label Switching (MPLS) techniques, and so forth. In some instances, real or virtual switches, routers or other network elements that interconnect service nodes 10 may be configured to direct packet flow to the service nodes 10 according to service chains.

In some examples, central server 14 may be a software-defined networking (SDN) controller that provides a high-level controller for configuring and managing routing and switching infrastructure of service provider network 2 (e.g., CE router 18, DC border router 8, core network 7 and service nodes 10). In some instances, central server 14 manages deployment of virtual machines within the operating environment of value-added services complex 9. For example, central server 14 may interact with DC border router 8 to specify service chain information. For example, the service chain information provided by central server 14 may specify any combination and ordering of value-added services provided by service nodes 10, traffic engineering information (e.g., labels or next hops) for tunneling or otherwise transporting (e.g., MPLS or IP tunnels) packet flows along service paths, rate limits, Type Of Service (TOS) markings or packet classifiers that specify criteria for matching packet flows to a particular service chain. Further example details of an SDN controller are described in PCT International Patent Application PCT/US13/44378, filed Jun. 5, 2013, the entire contents of which are incorporated herein by reference.

In accordance with the techniques of this disclosure, one or both of CE router 18 and data center border router 8 includes a probe module that sends probe packets along service path 28 to initiate reporting of statistics about the service path. As described herein, network elements along the service path 28 that receive the probe packets may modify the probe packets to include timestamp information indicating a time at which the probe packet was processed by the particular network element, and then forward the probe packets to a next network element in the forwarding path. The network elements can also send respective messages 17 to SDN controller 14 that report the timestamp information contained within the probe packet or other information.

SDN controller 14 can configure CE router 18 and/or data center border router 8 to send the probe packets. For example, SDN controller 14 can send one or more of configuration messages 19A-19B ("configuration messages 19") to configure CE router 18 and data center border router 8, respectively. SDN controller 14 can send configuration messages 19 by any of a variety of mechanisms, such as by static CLI, a network management protocol such as Network Configuration Protocol ("Netconf"), SNMP configurations, Path Computation Element Communication Protocol (PCEP) extensions or Vendor Specific Attributes, Border Gateway Protocol (BGP) extensions or Vendor Specific Attributes, or other protocol. In some examples, SDN controller 14 may be an OpenFlow Controller that crafts the injection probe Packets and sends them to the determined Ports of OpenFlow switch client software on CE router 18 and/or data center border router 8 (similar technology may also be used to capture the injected packets and mark them). In this example, the element generating the probe packet is SDN controller 14 and the element outputting the probe packet on the path is CE router 18 and/or data center border router 8.

In some examples, the probe packets may be IP-based Internet Control Message Protocol (ICMP) packets that have been extended to include the timestamp information in data fields. In other examples, the probe packets may be Uniform Datagram Protocol (UDP) or Transmission Control Protocol (TCP) packets extended to include the timestamp information in UDP option fields or TCP option fields.

SDN controller 14 receives the probe information from one or more respective network element(s), such as service nodes 10, DC border router 8, e.g., via messages 17, and may store the probe information. Message 17 may be an Extensible Messaging and Presence Protocol (XMPP) message, for example. As another example, message 17 may be an OpenFlow message or any other proprietary Cloud Management Protocol. SDN controller 14 can aggregate all of the probe information received from multiple network elements along a given forwarding path 28. SDN controller 14 may perform the aggregation based on fields of the probe packets, such as port/interface ID field and/or probe identifier field, for example. SDN controller 14 can present the aggregated information to customer 10, e.g., by outputting a report 11.

Figure 2:
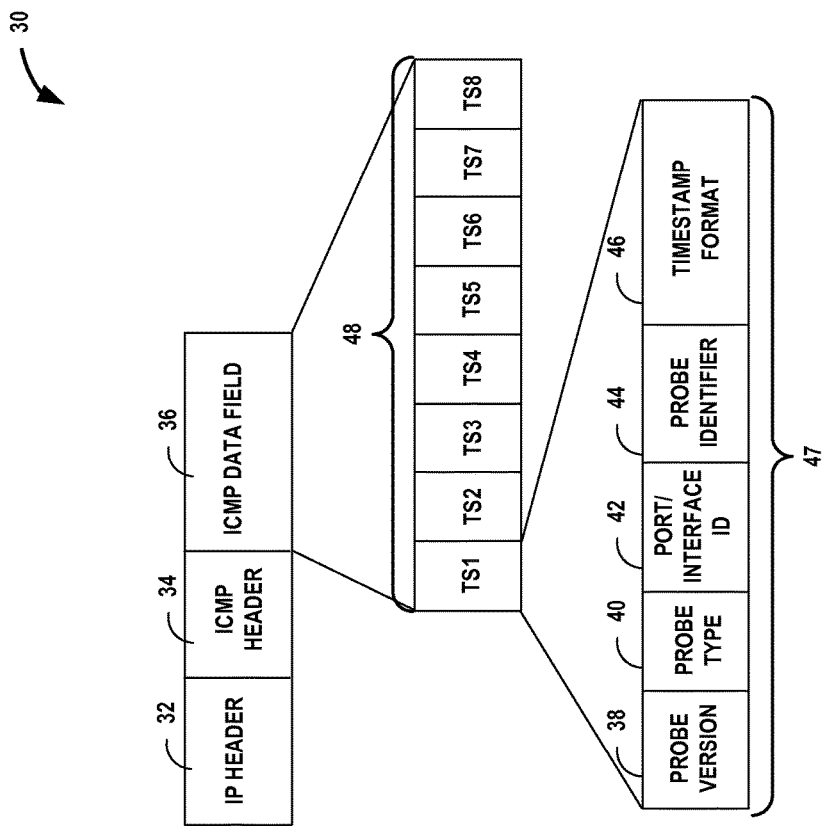
FIG. 2 is a block diagram illustrating an example probe packet that may be processed by a computing device according to techniques described in this disclosure.

FIG. 2 is a block diagram illustrating an example probe packet 30 that may be processed by a computing device according to techniques described in this disclosure. Probe packet 30 may be a tunnel packet sent through a service chain in an overlay network. In some examples, probe packet 30 may be created by SDN controller 14 (FIG. 1) and provided to CE router 18 or DC border router 8, and in turn, one of CE router 18 or DC border router 8 can send the probe packet 30 through service complex 9. In other examples, probe packet 30 may be created by one of CE router 18 or DC border router 8 based on configuration, such as by SDN controller 14, for example.

The design of the timestamp data in the (mostly ICMP based) injection packets can be very simple with static fields. This will allow network elements on the forwarding path 28 to not only read-out the data that is inserted by the Probe Injector, but also allow them to include their own timestamp information on the Path.

In some examples, the probe packets may be no longer than the shortest MTU of the path to avoid the elements on the path having to deal with packet fragmentation when they attempt to insert Probe Data. Probe packet 30 includes an IP header 32, and ICMP header 34, and an ICMP data field 36. In the example of FIG. 2, the probe injecting device, e.g., CE router 18 or DC border router 8, can generate the ICMP Data field 36 with a size that is modulo 16 (byte size of the Timestamp Probe 47 Data) and fill it with 0x00 then insert its own Timestamp at the top.

Although described for purposes of example with respect to an ICMP packet, in other examples TCP or UDP options fields may be used for probe packet timestamps. This may be useful in situations where services virtual machines on service nodes 10 might not forward ICMP packets, for example.

In the example of FIG. 2, ICMP data field 36 includes one or more Timestamp probe packets 48. Every virtual or physical element along the forwarding path (service tunnel) that receives probe packet 30 can add a Timestamp Probe 47 until the ICMP Data field 36 is filled. Timestamp Probes 47 include a probe version field 38. In some examples, probe version field 38 may include one byte specifying the probe version. A given Timestamp Probe 47 also includes a probe type field 40, which may also include one byte specifying the probe type. Example values for the probe type field may be as follows:

1=Injector
2=Physical Switch
4=Physical Router
8=Hypervisor Element like a linuxbridge, vSwitch, vRouter
16=Guest VM Forwarding element vSwitch, vRouter
32=Guest Application/Service
64=Packet Reflector
128=0 if the Packet is sent in Forwarding direction and 1 if the Packet is reflected
(Echo-Reply)

A givenTimestamp Probe 47 can also include a Port (/Interface) ID field 42. Port/Interface ID field 42 may include two bytes specifying the port ID or interface ID from which the probe packet ingresses and/or egresses a network element. For example, Port/Interface ID field 42 may specify (egress/ingress) from 0x0001 to 0xfffe or MUST be set to 0xffff if unknown which means Port/Interface ID field 42 has to be !=0x0000 if it contains a valid timestamp.

A given Timestamp Probe 47 can also include a probe identifier field 44. Probe identifier field 42 may include four bytes specifying a "unique" address of the network element inserting the probe information along the path to determine which path was chosen. Usually this is the Internet Protocol version four (IPv4) Address of the network element. In some examples, this may be a different type of identifier other than an IP address.

A given Timestamp Probe 47 can also include a timestamp format field 46. Timestamp format field 46 may include eight bytes. When the injecting device generates the probe packet 30, the injecting device may include its own timestamp information indicating a time at which the probe packet 30 is being sent from the injecting device, in the first timestamp probe slot TS1, and the remaining timestamp probe slots TS2-TS8 of ICMP data field 36 may be empty. Each network element along the forwarding path may modify the received probe packet 30 to include its own timestamp information in an inserted probe 47 of timestamp probe packets 48. The timestamp information in timestamps 46 may accord with a networking protocol for clock synchronization between computer systems, such as Network Time Protocol (NTP) or Precision Time Protocol. Each inserted Timestamp Probe 47 also contains information about the element inserting the timestamp probe 47, such as Probe Type 40, Port or Interface 42 and Probe identifier 44. Network elements capable of inserting timestamp probes 47 can do so as long as there is space left in the ICMP Data field 36.

In some examples, controller 200 may provide the injecting device (e.g., CE router 18 or DC border router 8) with a special destination IP address and/or source IP address to include in probe packet 30, which indicates to the probe modules of receiving devices that packet 30 is a special probe packet to be treated in accordance with the techniques of this disclosure. As another example, CE router 18 or DC border router 8 may set a flag in the ICMP header 34 or IP header 32 to indicate that packet 30 is a special probe packet to be treated in accordance with the techniques of this disclosure.

Figure 3:
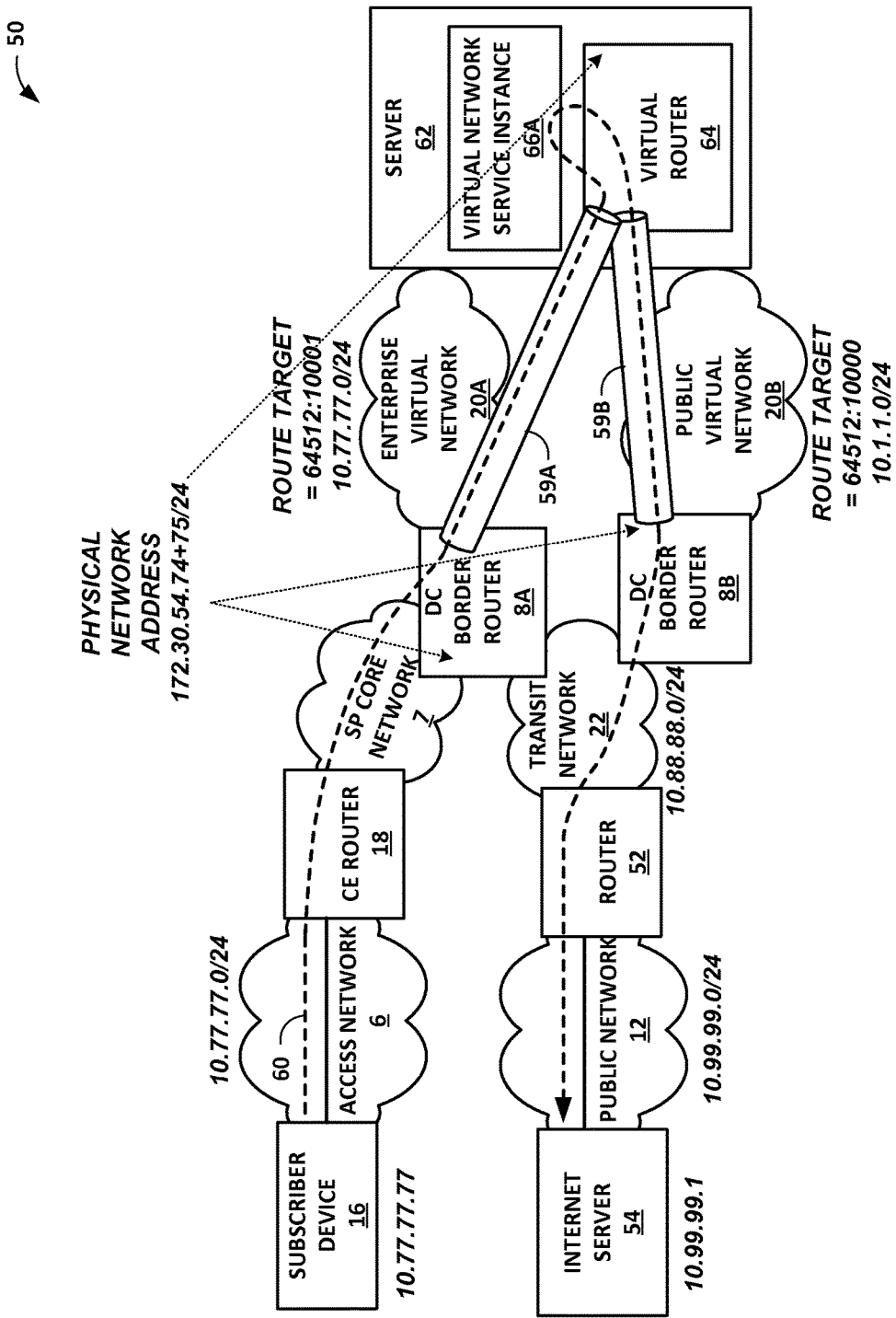
FIG. 3 is a block diagram illustrating an example network system in accordance with techniques described herein.

FIG. 3 is a block diagram illustrating an example network system 50 in accordance with techniques described herein. Network system 50 may be similar to network system 1 of FIG. 1. Subscriber traffic 60 may flow from subscriber device 16, through server 62 in a data center for application of one or more services, and on to a public network 12 such as the Internet. DC border router 8A may send the traffic through tunnels 59A-59B ("tunnels 59"). In some examples, tunnels 59 are layer three (L3) overlay tunnels in an overlay network. For example, DC border router 8A may use overlay encapsulations with header information relating to the transport tunnel, tenant identification, and encapsulated payload. In L3 overlay tunnels, the overlay encapsulation may consist of L3 over MPLS over GRE, or L3 over MPLS over UDP, for example. In L2 overlay tunnels, the overlay encapsulation may consist of L2 over MPLS over GRE, L2 over Virtual Extensible LAN (VXLAN), or L2 over MPLS over UDP, for example. Tunnels 59 may carry service traffic for one or more pseudowires (not shown). In some examples, tunnels 59 may be a single tunnel. In any case, router 8A may insert ICMP packets with timestamp information in the data field where router 8A would otherwise typically place padding data.

When the traffic 60 reaches server 62, which may correspond to data center 9, virtual router 64 may receive the traffic 60 and send the traffic to virtual network service (VNS) instance 66A for application of one or more services, such as network address translation (NAT), for example. Although shown in FIG. 3 as a virtual router 64, in some examples this may be a virtual switch.

In the example of FIG. 3, subscriber device 16 may have an IP address of 10.77.77.77. The link through access network 6 may be any L3 access technology. Access network 6 may use subnet 10.77.77.0/24. Enterprise virtual network 20A, which may be a tenant enterprise network, may use a subnet of 10.77.77.0/24 also, and have a route target of 64512:10001. DC border router 8A, virtual router or virtual switch 64, and DC border router 8B may each have an associated physical network address of 172.30.54.74+75/24. Although shown as two devices, in some examples, DC border routers 8A and 8B may be the same device.

Public virtual network 20B, which may be a tenant public network, may use a subnet of 10.1.1.0/24 also, and have a route target of 64512:10000. Transit network 22 may use a subnet of 10.88.88.0/24, and public network 12 may use a subnet of 10.99.99.0/24. Internet server 54 may have an IP address of 10.99.99.1.

In the example of FIG. 3, either CE router 18 or DC border router 8A may inject probe packets into forwarding path. For example, CE router 18 may create probe packets at a VRF of an enterprise, and includes a device ID of CE router 18 in the context of the VRF, and a timestamp indicating a time at which CE router 18 sends the probe packet. In some examples, CE router 18 or DC border router 8 can use a separate VRF for the probe packets so the probe packets are separate from regular customer traffic. When virtual router or virtual switch 64 of server 62 in the data center receives the probe packets, a probe module of virtual router or virtual switch 64 can add its timestamp information and forward the modified packet to virtual network service instance 66A. Virtual router/switch 64 can also send a message reporting to SDN controller 14 the time the probe packet took over the WAN link through SP core network 7 by comparing the timestamp of the packet to the time virtual router/switch 64 detected the incoming probe packet. The probe packets are crafted to ensure that the packets will be transmitted by tunnels 59. virtual network service instance 66A can forward the packet back to virtual router/switch 64 after application of services by a services VM, and virtual router/switch 64 can again add timestamp information to the packet and report to SDN controller 14 the time the packet took within the services VM of virtual network service instance 66A by comparing its earlier timestamp to the time that virtual router/switch 64 detected the probe packet on the other side of the interface to virtual network service instance 66A. This can provide an indication of latency of the services VM. Virtual router/switch 64 can forward the packet along the forwarding path to DC border router 8B, which can also add timestamp information and send a message to SDN controller reporting timestamp information.

Injecting the packets at CE router 18 can have advantages such as providing information about the health and latency of the WAN link inside the SP core Network 7 between CE router 18 and DC border router 8, and can provide an end-to-end SLA based on the borders of the complete WAN and DC network. Conversely, injecting the packets at CE router 18 has the disadvantage that this may be a device that is not within the control of the SP network 2. Alternatively, DC border router 8A may create the probe packets and inject them into the forwarding path. The approach of injecting the packets at the DC border routers 8 may just need an upgrade of DC border router 8A and 8B of the Datacenter, which is relatively easy to control.

For example, the packets need to look like any other type of packet that the L3 overlay tunnels 59 will transport. Typically, layer 2 Ethernet Frames, like those used for Ethernet Operations and Management (OAM) will not be transported by overlay tunnels 59. ICMP, UDP or TCP may be used for the probe packets, for example.

In this manner, the techniques of the disclosure can provide the ability to measure service delivery, jitter, link-loss indication and latency in a network functions virtualization (NFV) environment through the use of probe packets.

Figure 4:
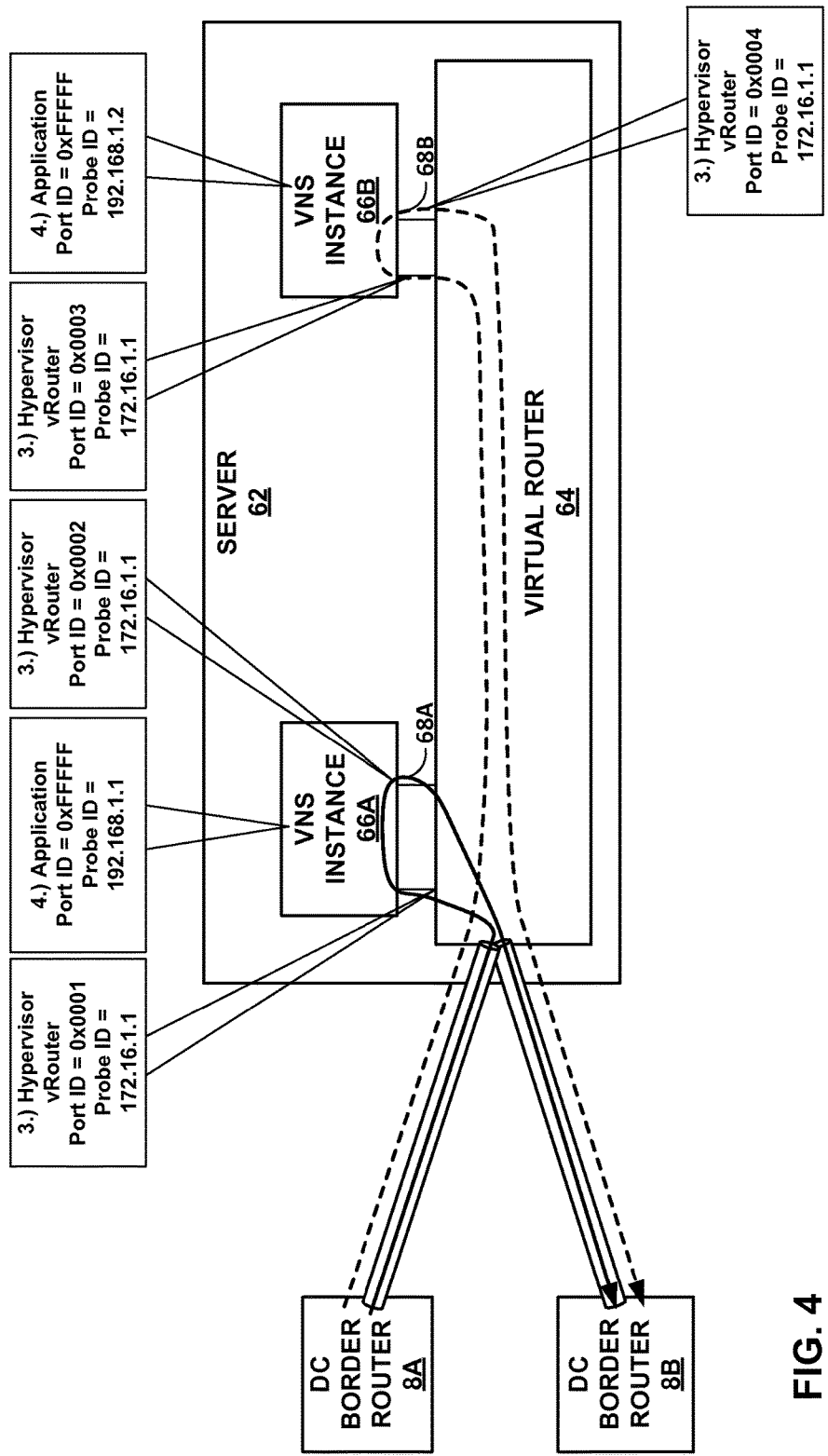
FIG. 4 is a conceptual diagram illustrating example forwarding paths of probe packets in a data center according to techniques described in this disclosure.

FIG. 4 is a conceptual diagram illustrating example forwarding paths of probe packets in a data center according to techniques described in this disclosure. FIG. 4 illustrates how the DC border router 8A can send two different probe packets along two different forwarding paths 68A and 68B. The different forwarding paths 68A and 68B can each traverse a distinct one of virtual network service instances 66A and 66B, respectively. FIG. 4 also shows the port ID and Probe ID at different network elements, such as a hypervisor virtual router/switch 64, then to applications at virtual network service instances 66A and 66B, and back to the hypervisor virtual router/switch 64.

A Load Balancing Mechanism in the probe injecting device (e.g., CE router 18, DC border router 8A) or inside the Virtual environment may cause different probe packets to pass multiple different Virtual Service machines. Server 62 may launch multiple virtual machines. For example, an Equal Cost Multi-Path (ECMP)-based load balancing mechanism can be used to balance the probe packets between virtual network service VMs. This can enable testing of more than one service VM. Even if VMs are located on the same server 62, various Probe IDs (likely for Applications) or Port IDs (likely for virtual Router/switch 64 in Hypervisor) are unique to the VM system and will change as indicated in FIG. 4, giving unique information about the Path.

In case the Probe Injector has some knowledge about the how the Load balancer of virtual router/switch 64 is working (which the probe injector can receive as configuration data from the central controller 14, for example), the probe injector may also change other information on the Packet to have the Load Balancer distributing the Probe packets among the virtual network Service VMs and steer them into multiple paths to reach every virtual network service VM. For example, to leverage a hash-based distribution ECMP mechanism, the packet injecting device may change the Source-IP address used when sending the Probe packet (e.g., round-robin) to obtain information through various different forwarding paths, such as forwarding paths 68A, 68B.

Figure 5:
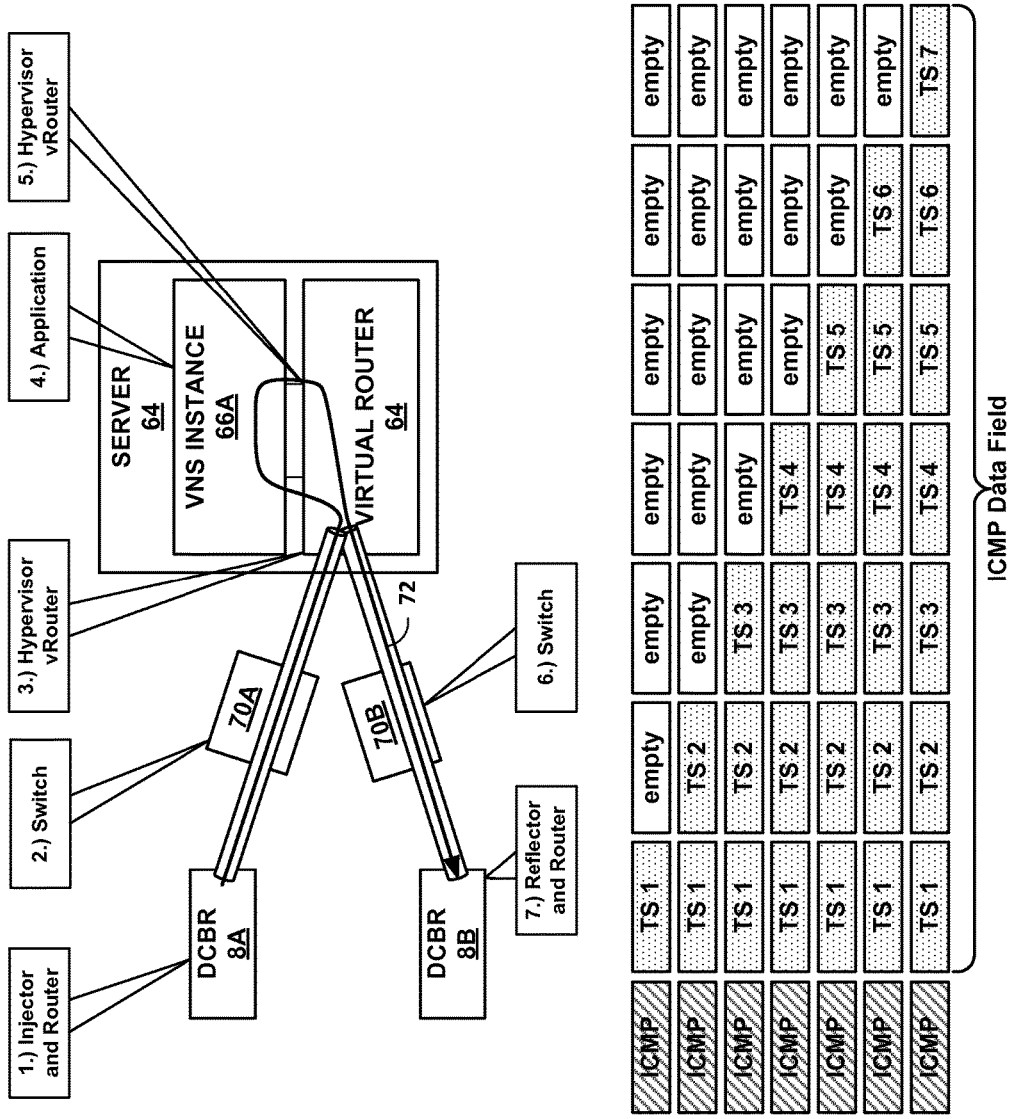
FIGS. 5 and 6 conceptual diagrams illustrating timestamp information added by different network elements according to techniques described in this disclosure.
Figure 6:
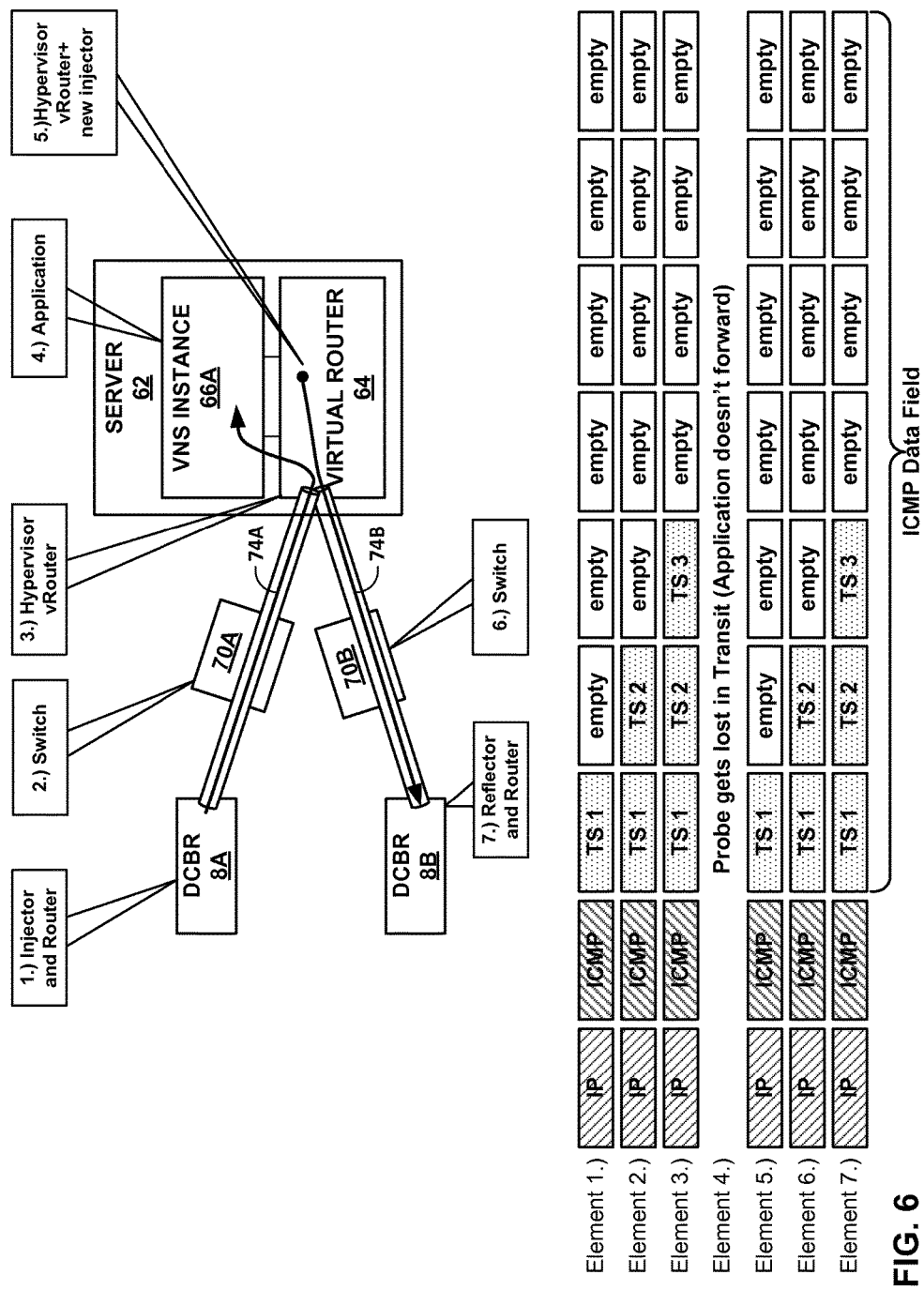

FIGS. 5 and 6 are conceptual diagrams illustrating timestamp information added by different network elements according to techniques described in this disclosure. As shown in FIGS. 5 and 6, different network elements are numbered 1-7 to show the order in which they are traversed by a probe packet in the forwarding path 72. The network elements may be part of the physical "underlay" network, the virtual "overlay" network or the virtual machines network. The network elements of FIGS. 5 and 6 may correspond to those shown in FIGS. 3-4. As seen in FIG. 5, each of the network elements, including the injecting router 8A, adds its own timestamp information to the ICMP data field. By the time the last element, router 8B, has added its timestamp TS7, all of the bits in the ICMP data field may be filled. In this manner, the network elements can insert timestamp information into the ICMP data field rather where they would otherwise have inserted padding data in the absence of the modifications described herein.

FIG. 6 is a conceptual diagram illustrating timestamp information added by different network elements according to techniques described in this disclosure, similar to FIG. 5, except that in FIG. 6, element 4 (an application) does not forward the probe packet. Thus, timestamp information from only elements 1-3 was added along forwarding path 74A. Yet, a new injecting device (e.g., a probe module at a hypervisor of virtual router/switch 64) can inject a new probe packet that is forwarded along forwarding path 74B by network elements 5-7, which each modify the probe packet to insert their own timestamp information to the ICMP data field of the packet.

In case certain SLAs need to be assured the following may be kept in mind to assure the right SLA. In using NTP for clock synchronization, the following error types may be possible. Reference Clock Sync Errors may be introduced by the delay the various elements have due latency getting to the same clocksource. If the elements are all in the same Datacenter, as in the case of DC router 8 being the probe injecting device, this should not have much effect. But this error may have to be compensated for if a WAN is also involved with the Probe packets, such as in the case of an edge PE router like CE router 18 being the probe injecting device. Intrinsic Measurement Errors are errors that are introduced due to latency or jitter inside the forwarding Hardware Router/Switch. In some cases those may be compensated for with special Hardware/Operating System (OS) treatment.

SLAs for Virtual Machine environments may not be doable in respect to µ-second resolution and tend to be more doable in the milli-second resolution range. Writing SLA for Highspeed Trading applications may not be possible in all Virtual Machine environments.

Various techniques may be used to deal with varying accuracy of timestamp information. Insertion of Timestamp information is only assured for the injector element, i.e., the element that initially sends the first probe packet. Elements on the path may use the information collected so far, or the elements may ignore the probe packets and their information. In the same manner it is not sure the elements will be able to inject information even if the design goals made it easy to do that. It may be relatively easy to have virtual Router/switch 64 in the Hypervisor of server 62 (or Guest in case it cannot be integrated into a proprietary Hypervisor) inserting and modifying the Data of probe packets. It may be relatively difficult to have the underlay (physical network) Switches 70A, 70B injecting Timestamps, so this timestamp information may not be included in some examples. It may be relatively difficult to have the Application in the VM Guest adding the information.

The techniques described herein can allow for some new error correction and SLA reports. For example, the analyzing device (e.g., SDN controller 14) may use a statistical filter to account for clock errors. For example, SDN controller 14 could correct for an error in Timestamp 4 by applying a simple statistical filter, as a majority of other timestamps is in bound. There may also be higher Accuracy on same Probe IDs. Assume the Packet traverses the same element twice, such as virtual router/switch 64 in Probe elements 3 and 5 shown in FIG. 5. As Probe elements 3 and 5 have the same clocksource, SDN controller 14 can assume that the Reference Clock Sync Error is almost not existing and that the latency measurement for the time span between (usually in the Virtual Guest) has a high accuracy. Latency checks of the Service VMs can be important, so it may be helpful to have an accurate measurement of those.

In some examples, the network may be configured (e.g., by SDN controller 14) to place multiple probe injecting device on the forwarding path. A Probe injector is at minimum required at the beginning of the Path, but there could also be technical reasons to place multiple probe injectors along the Path. For example, SDN controller 14 may determine, based on analysis of probe report information received from network elements, that a link in the system is broken, and in response SDN controller 14 automatically places new Probe injectors to find out more details about the issue.

The techniques of this disclosure are flexible enough to provide simple measurements and also optionally allow all elements in the path to contribute (insert timestamp information) or measure the performance regardless of whether they are elements of the overlay network or parts of the underlying physical network. The techniques of this disclosure are state-less by nature as it is not assured that each and every element in the path will be able to insert timestamps. Even forwarding to all elements may not be possible (especially if the Service VM is not forwarding or responding). The probing technique may be able to guarantee a certain SLA only if the initial probe message receives a direct response from the reflecting element or if the Monitoring Packet is arriving at the element of a service chain to report the measurements. If this is not happening the techniques of this disclosure may be able to help indicating where there may be a problem with elements in the path.

For example, there could be an Application that does not support forwarding the Probe packets. This is the case for example if the Service VM contains a HTTP Proxy (for Caching/Filtering/Header Insertion) it will work on Layer 7 and hardly forward ICMP packets, which are the Probe packets. So SDN controller 14 can deal with this by establishing new Injectors close to where the Probe Packets are lost. As shown in FIG. 6, a new injecting device (e.g., a probe module at a hypervisor of virtual router/switch 64) can inject a new probe packet that is forwarded along forwarding path 74B by network elements 5-7, which each modify the probe packet to insert their own timestamp information to the ICMP data field of the packet.

Figure 7:
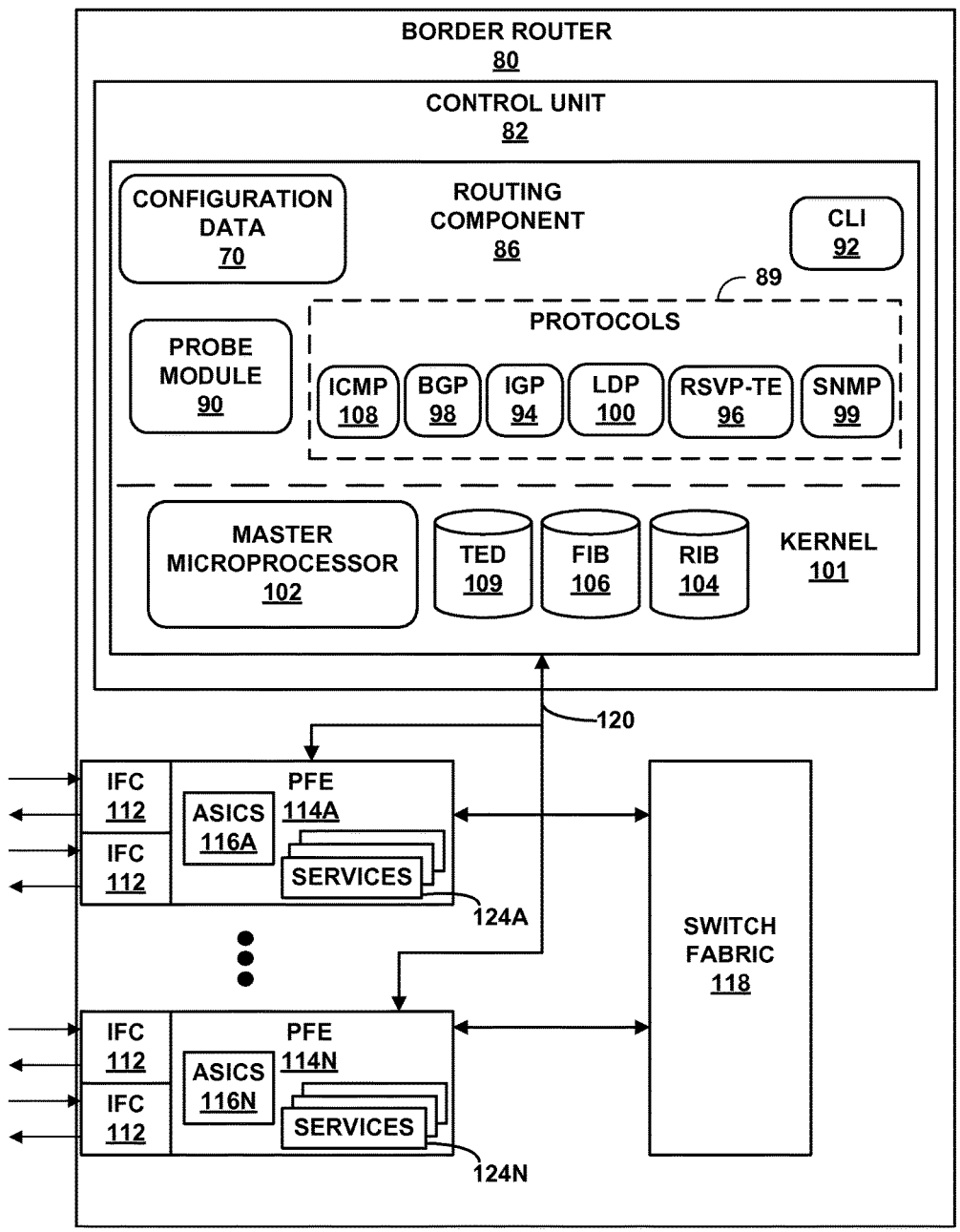
FIG. 7 is a block diagram illustrating an example border router network device in accordance with the techniques of this disclosure.

FIG. 7 is a block diagram illustrating an example border router operable to inject probe packets into a forwarding path through a data center in accordance with techniques described herein. For purposes of illustration, border router 50 may be described herein within the context of example network system 2 of FIG. 1, and may represent any of CE router 18 or data center border routers 8, 8A, or 8B, for example. Moreover, while described with respect to a particular network device, e.g., a router, the techniques may be implemented by any network device that may operate as a service endpoint, such as a Layer 3 (L3) or L2/L3 switch or server.

In the example of FIG. 3, border router 80 includes control unit 82 in which routing component 86 provides control plane functionality for border router 80. Border router 80 also includes a plurality of packet-forwarding engines 114A-114N ("PFEs 114") and a switch fabric 118 that collectively provide a data plane for forwarding network traffic. PFEs 114 receive and send data packets via interface cards 112 ("IFCs 112"). In other embodiments, each of PFEs 114 may comprise more or fewer IFCs. Although not shown, PFEs 114 may each comprise a central processing unit (CPU) and a memory. In this example, routing component 86 is connected to each of PFEs 114 by a dedicated internal communication link 120. For example, dedicated link 120 may comprise a Gigabit Ethernet connection. Switch fabric 118 provides a high-speed interconnect for forwarding incoming data packets between PFEs 114 for transmission over a network. U.S. Patent Application 2008/0044181, entitled MULTI-CHASSIS ROUTER WITH MULTI-PLEXED OPTICAL INTERCONNECTS, describes a multi-chassis router in which a multi-stage switch fabric, such as a 3-stage Clos switch fabric, is used as a high-end forwarding plane to relay packets between multiple routing nodes of the multi-chassis router. The entire contents of U.S. Patent Application 2008/0044181 are incorporated herein by reference.

Routing component 86 provides an operating environment for execution of various protocols 89 that may comprise software processes having instructions executed by a computing environment. As described in further detail below, protocols 89 provide control plane functions for storing network topology in the form of routing tables or other structures, executing routing protocols to communicate with peer routing devices and maintain and update the routing tables, and providing management interface(s) to allow user access and configuration of border router 80. Control unit 82 provides an operating environment for routing component 86 and may be implemented solely in software, or hardware, or may be implemented as a combination of software, hardware or firmware. For example, control unit 82 may include one or more processors which execute software instructions. In that case, routing component 86 may include various software modules or daemons (e.g., one or more routing protocol processes, user interfaces and the like), and control unit 82 may include a computer-readable storage medium, such as computer memory or hard disk, for storing executable instructions.

Command line interface daemon 92 ("CLI 92") provides an interface by which an administrator or other management entity may modify the configuration of border router 80 using text-based commands. Simple Network Management Protocol daemon 99 ("SNMP 99") comprises an SNMP agent that receives SNMP commands from a management entity, such as SDN controller 14 (FIG. 1), to set and retrieve configuration and management information for border router 80. Using CLI 92 and SNMP 99, one or more management entities may enable/disable and configure services, install routes, enable/disable and configure rate limiters, configure interfaces, and configure probe module 90, for example.

One or more routing protocols, such as IGP 94 or BGP 98, maintains routing information in the form of routing information base (RIB) 104 that describes a topology of a network, and derives a forwarding information base (FIB) 106 in accordance with the routing information. In general, the routing information represents the overall topology of the network. IGP 94 and BGP 98 can interact with kernel 101 (e.g., by way of API calls) to update RIB 104 based on routing protocol messages received by border router 80. RIB 104 may include information defining a topology of a network, including one or more routing tables and/or link-state databases.

Typically, the routing information defines routes (i.e., series of next hops) through a network to destinations/prefixes within the network learned via a distance-vector routing protocol (e.g., BGP) or defines the network topology with interconnected links learned using a link state routing protocol (e.g., IS-IS or OSPF). In contrast, FIB 106 is generated based on selection of certain routes within the network and maps packet key information (e.g., destination information and other select information from a packet header) to one or more specific next hops and ultimately to one or more specific output interface ports of IFCs 112. Routing component 86 may generate the FIB in the form of a radix tree having leaf nodes that represent destinations within the network. Details on an example embodiment of a router that utilizes a radix tree for route resolution are provided in U.S. Pat. No. 7,184,437, the entire contents of which are incorporated herein by reference.

Routing component 86 also provides an operating environment of one or more traffic engineering protocols to establish tunnels for forwarding subscriber packets through the ordered set of service nodes 10 associated with different service chains. For example, RSVP-TE 96 may execute the Resource Reservation Protocol with Traffic Engineering extensions to exchange traffic engineering (TE) information, such as MPLS labels for enabling label-based packet forwarding. As another example, routing component 86 may use GRE or IP-based tunneling protocols (not shown) to establish traffic engineered tunnels. Routing component 86 may maintain, for example, a traffic engineering database (TED) 109 to store the traffic engineering data. Protocols 89 can also include label distribution protocol (LDP) 100.

Routing component 86 communicates data representative of a software copy of the FIB 106 into each of PFEs 114 to control forwarding of traffic within the data plane. This allows the software FIB stored in memory (e.g., RAM) in each of PFEs 114 to be updated without degrading packet-forwarding performance of border router 80. In some instances, routing component 86 may derive separate and different software FIBs for each respective PFEs 114. In addition, one or more of PFEs 114 include application-specific integrated circuits (ASICs 116) that PFEs 114 program with a hardware-copy of the FIB based on the software FIBs (i.e., hardware versions of the software FIBs) copied to each respective PFE 114.

For example, kernel 101 executes on master microprocessor 102 and may comprise, for example, a UNIX operating system derivative such as Linux or Berkeley Software Distribution (BSD). Kernel 101 processes kernel calls from IGP 94 and RSVP-TE 96 to generate forwarding information in the form of FIB 106 based on the network topology represented in RIB 104, i.e., performs route resolution and path selection. Typically, kernel 101 generates FIB 106 in the form of radix or other lookup trees to map packet information (e.g., header information having destination information and/or a label stack) to next hops and ultimately to interface ports of interface cards associated with respective PFEs 114. FIB 106 may associate, for example, network destinations with specific next hops and corresponding IFCs 112. For MPLS-related traffic forwarding, FIB 106 stores, for a given FEC, label information that includes an incoming label, an outgoing label, and a next hop for a packet.

Master microprocessor 102 executing kernel 101 programs PFEs 114 to install copies of the FIB 106. Microprocessor 102 may comprise one or more general- or special-purpose processors such as a digital signal processor (DSP), an application specific integrated circuit (ASIC), a field programmable gate array (FPGA), or any other equivalent logic device. Accordingly, the terms "processor" or "controller," as used herein, may refer to any one or more of the foregoing structures or any other structure operable to perform techniques described herein.

In this example, ASICs 116 are microcode-controlled chipsets (i.e., forwarding circuits) programmably configured by a slave microprocessor executing on each of PFEs 114. When forwarding packets, control logic with each ASIC 116 traverses the forwarding information (FIB 106) received from routing component 86 and, upon reaching a FIB entry for the packet (e.g., a leaf node), microcode-implemented control logic 56 automatically selects a forwarding next hop and processes the packets in accordance with the operations defined within the next hop. In this way, ASICs 116 of PFEs 114 process packets by performing a series of operations on each packet over respective internal packet forwarding paths as the packets traverse the internal architecture of border router 80. Operations may be performed, for example, on each packet based on any of a corresponding ingress interface, an ingress PFE 114, an egress PFE 30, an egress interface or other components of border router 80 to which the packet is directed prior to egress, such as one or more service cards. PFEs 114 each include forwarding structures that, when executed, examine the contents of each packet (or another packet property, e.g., incoming interface) and on that basis make forwarding decisions, apply filters, and/or perform accounting, management, traffic analysis, and load balancing, for example.

In one example, each of PFEs 114 arranges forwarding structures as next hop data that can be chained together as a series of "hops" along an internal packet forwarding path for the network device. In many instances, the forwarding structures perform lookup operations within internal memory of ASICs 116, where the lookup may be performed against a tree (or trie) search, a table (or index) search. Other example operations that may be specified with the next hops include filter determination and application, or a rate limiter determination and application. Lookup operations locate, within a lookup data structure (e.g., a lookup tree), an item that matches packet contents or another property of the packet or packet flow, such as the inbound interface of the packet. The result of packet processing in accordance with the operations defined by the next hop forwarding structure within ASICs 116 determines the manner in which a packet is forwarded or otherwise processed by PFEs 114 from its input interface on one of IFCs 112 to its output interface on one of IFCs 112.

In general, kernel 101 may generate FIB 106 and thereby program ASICs 116 to store forwarding structures associated with each service chain. For example, ASICs 116 may be configured with forwarding information that specifies traffic engineering information, such as IP header information or MPLS labels, as well as operations for causing programmable ASICs 116 to encapsulate subscriber packets in accordance with the forwarding information. In this way, ASICs 116 may process subscriber packets to select particular service paths for each packet and encapsulate the subscriber packets in accordance with the selected service paths. Routing component 86 may generate RIB 104 and FIB 106 to associate subscriber packet flows with particular service paths based on one or more service profiles associated with each subscriber, as may be received from an Authentication, Authorization and Accounting (AAA) server, a policy controller, SDN controller or other network element.

Routing component 86 can configure probe module 90 based on configuration data 70 that controls the operation of probe module 90 for injecting probe packets into a network. Configuration data 70 stores configuration data to a computer-readable storage medium. Probe module 90 may be a daemon executing on routing component 86. In some examples, probe module 90 may be located within kernel 101.

In some examples, border router 80 can receive configuration data 70 via CLI 92 or a network management protocol such as Network Configuration Protocol ("Netconf"). In these and other examples, border router 80 can receive configuration data 70 by SNMP configurations via SNMP module 99. In these and other examples, border router 80 can receive configuration data 70 by PCEP extensions or Vendor Specific Attributes. In these and other examples, border router 80 can receive configuration data 70 by Border Gateway Protocol (BGP) based signaling using extensions or Vendor Specific Attributes via BGP module 98. This may be a scalable option, as border router 80 may already be running BGP module 98, even in the case of an edge PE router such as router 18 (FIG. 1). Although these protocols are described for purposes of example, other suitable protocols may be used. In some examples, probe module 90 receives probe packets crafted by a central controller, which probe module 90 can then forward from border router 90.

In accordance with the techniques described herein, probe module 90 is capable to send (inject) a probe packet to a network destination, such as an Internet server 54 (FIG. 3) in public network 12. Probe module 90 may obtain the network destination address to use in various ways. In some examples, probe module 90 learns the path/destination leaked via leaked routes that appear on the sending VRF where the injector is placed. In some cases, it can be assumed that the injecting VRF always sends the probe packets towards the Internet, so some chosen Internet destination address may be configured as the probe packet destination, such as 8.8.8.8, for example. In other examples, probe module 90 may have knowledge of an IP address of the tunnel end 59B on the DC router 8B (FIG. 3), and can use this for the probe packet network destination address.

ICMP module 108 may send the probe packets as ICMP packets. In some examples, probe module 90 can be configured (e.g., by SDN controller 14) to periodically send probe packets as part of performing end-to-end Pathalive Checks. Probe module 90 can perform regular Healthchecks of the Path. As another example, probe module 90 can send probe packets as part of performing end-to-end Latency Checks. For example, probe module 90 can perform regular Latency checks of the Path, and if the Path is including a virtual Router on every virtual Router and Interface in the Path.

In some examples, probe module 90 may perform one or more initial Loadtests. That is, instead of simple periodic checks, depending on the service, probe module 90 may be configured to do initial loadtests to evaluate how a service performs in the data center. As an example, probe module 90 can start a TCP Echo-service at the end of the Path Telnet to Port 8 from the initiating probe module 90 and measure download performance. In some examples, probe module 90 may perform end-to-end Periodic Loadtests. In this way, probe module 90 can use the proposed mechanism for initial Loadtests to check the performance when the service is installed and distributed In some examples, probe module 90 may perform DC to DC checks. If the VRF of the end path is in another DC, probe module 90 may treat this as an end-to-end measurement of the whole cross-DC deployment. If the service is considered as a simple ICMP Ping mechanism, then only the initiating probe can measure the round-trip time, as elements on the path cannot determine how long the probe packet is already "on the wire."

As the initiating Probe sender, probe module 90 may be NTP timesynced and embeds clock information when sending the probe Packet. This gives all other Elements on the Path comparing this information with their own (NTP-Synced) clock information about how long the Packet traveled until this Point so the network elements can report this information to SDN controller 14. An analysing function, such as at SDN controller 14, having information from various probes on the path then gets an idea of which element causes which latency.

In some examples, probe module 90 may communicate with ICMP module 108 to generate a probe packet, and probe module 90 can add the Timestamp Data to the Data Field instead of just filling the Data Field with padding data.

The architecture of border router 80 illustrated in FIG. 7 is shown for example purposes only. This disclosure is not limited to this architecture. In other examples, border router 80 may be configured in a variety of ways. In one example, some of the functionally of control unit 82 may be distributed within IFCs 112. Control unit 82 may be implemented solely in software, or hardware, or may be implemented as a combination of software, hardware, or firmware. For example, control unit 82 may comprise one or more of a processor, a programmable processor, a general purpose processor, an integrated circuit, an Application Specific Integrated Circuit (ASIC), a Field Programmable Gate Array (FPGA), or any type of hardware unit capable of implementing the techniques described herein. Control unit 82 may further include one or more processors which execute software instructions stored on a computer readable storage medium, such as random access memory (RAM), read only memory (ROM), programmable read only memory (PROM), erasable programmable read only memory (EPROM), electronically erasable programmable read only memory (EEPROM), non-volatile random access memory (NVRAM), flash memory, a hard disk, a CD-ROM, a floppy disk, a cassette, magnetic media, optical media, or other computer-readable storage media. In some instances, the computer-readable storage medium may include instructions that cause a programmable processor to perform the techniques described herein.

Figure 8:
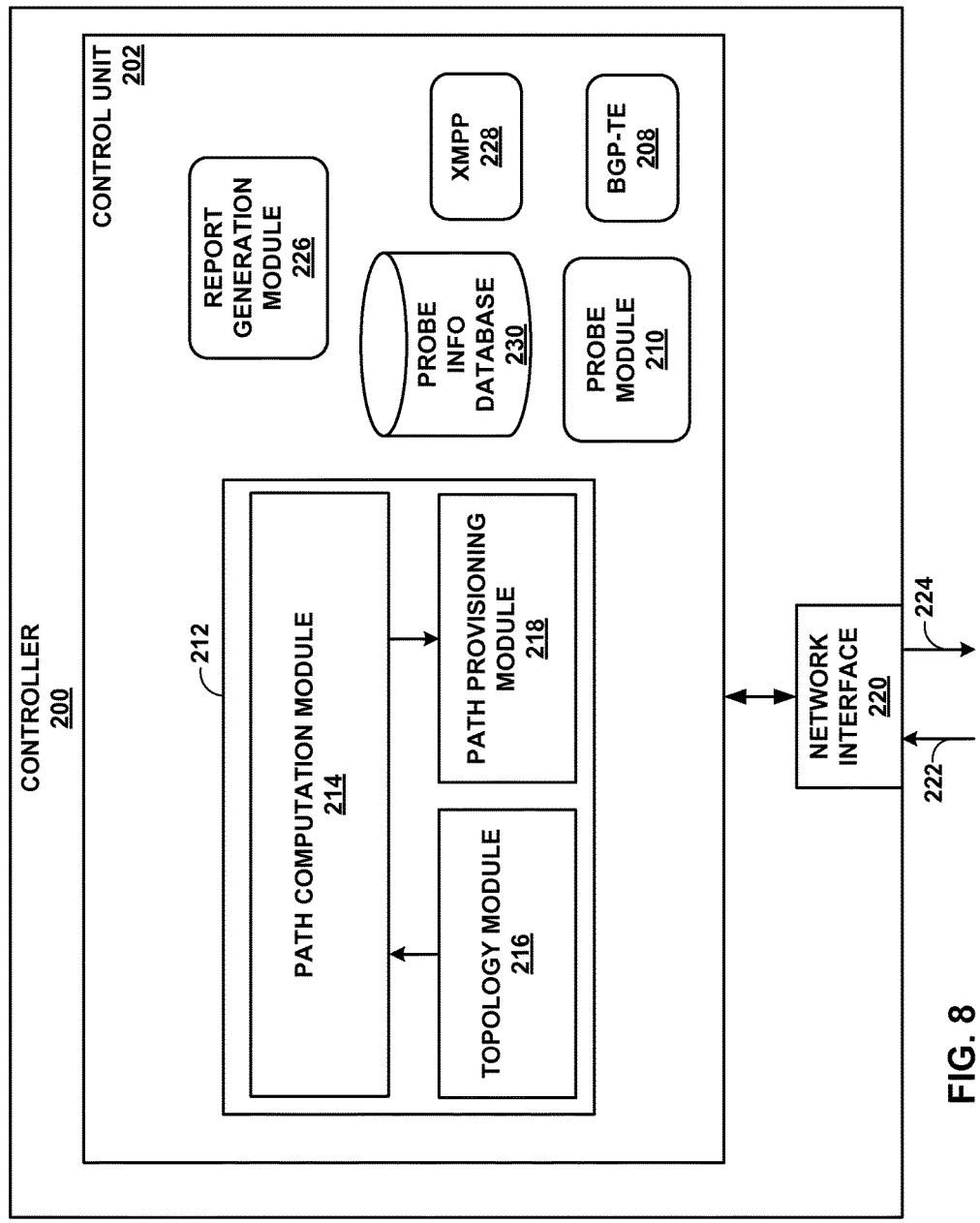
FIG. 8 is a block diagram illustrating an example controller network device in accordance with the techniques of this disclosure.

FIG. 8 is a block diagram illustrating an example controller network device in accordance with the techniques of this disclosure. Controller 200 may include aspects of one or more of a network controller, an Authentication, Authorization and Accounting (AAA) server, a policy controller, or SDN controller, for example, and may represent an example instance of SDN controller 14 of FIG. 1.

Central server 200 includes a control unit 202 coupled to a network interface 220 to exchange packets with other network devices by inbound link 222 and outbound link 224. Control unit 202 may include one or more processors (not shown in FIG. 4) that execute software instructions, such as those used to define a software or computer program, stored to a computer-readable storage medium (again, not shown in FIG. 4), such as non-transitory computer-readable mediums including a storage device (e.g., a disk drive, or an optical drive) or a memory (such as Flash memory or random access memory (RAM)) or any other type of volatile or non-volatile memory, that stores instructions to cause the one or more processors to perform the techniques described herein. Alternatively or additionally, control unit 202 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Control unit 202 provides an operating environment for network services applications 204, path computation element 212, BGP-TE module 208, and service resource module 210. In one example, these modules may be implemented as one or more processes executing on one or more virtual machines of one or more servers. That is, while generally illustrated and described as executing on a single central server 200, aspects of these modules may be delegated to other computing devices.

In some examples, controller 200 may intelligently compute and establish paths through the path computation domain, and so path computation element 212 includes topology module 216 to receive topology information describing available resources of the path computation domain, including access, aggregation, and edge nodes, interfaces thereof, and interconnecting communication links.

Path computation module 214 of path computation element 212 may compute requested paths through the path computation domain. Upon computing paths, path computation module 214 can schedule the paths for provisioning by path provisioning module 218. A computed path includes path information usable by path provisioning module 218 to establish the path in the network. Provisioning a path may require path validation prior to committing the path to provide for packet transport.

Control unit 202 also executes Border Gateway Protocol with Traffic Engineering extensions (BGP-TE) module 208 to peer with BGP speakers and BGP listeners to exchange routing information. In some examples, BGP-TE module 208 can send probe module configuration information as BGP vendor-specific attributes (VSAs) in accordance with techniques described herein. BGP-TE module 208 and BGP peers may perform a capability exchange (e.g., mutual advertisement) as part of the peering process to determine respective probe module capabilities of the BGP peers.

In some examples, routing component 86 uses a protocol such as Extensible Messaging and Presence Protocol (XMPP) 228 to communicate with at least virtual network switch 174 by an XMPP interface (not shown). Virtual network route data, statistics collection, logs, and configuration information may be sent as XML documents in accordance with XMPP 228 for communication between controller 200 and network devices such as DC border router 8, CE router 18, or service nodes 10, for example. Control plane VM 112A may in turn route data to other XMPP servers (such as an analytics collector) or may retrieve configuration information on behalf of one or more network devices.

Probe module 210 can generate the probe module configuration information, and also receives probe reporting information from network devices that have received a probe packet. In some examples, probe module 210 can generate the probe packets and provide them to the originating device(s). Probe module 210 can store received probe reporting information to probe information database 230 ("probe info database 230").

Probe module 210 or a separate analytics engine (not shown) can compile and analyze the probe reporting information from probe information database 230. In some examples, probe module 210 or the analytics engine can identify probe reporting information as being from the same packet flow, and hence to be analyzed together, based on various aspects, such as device identifier information, timestamp information, and other information. Report generation module 226 can aggregate the reporting information and generates a report for customers, such as customers 10 of FIG. 1.

Figure 9:
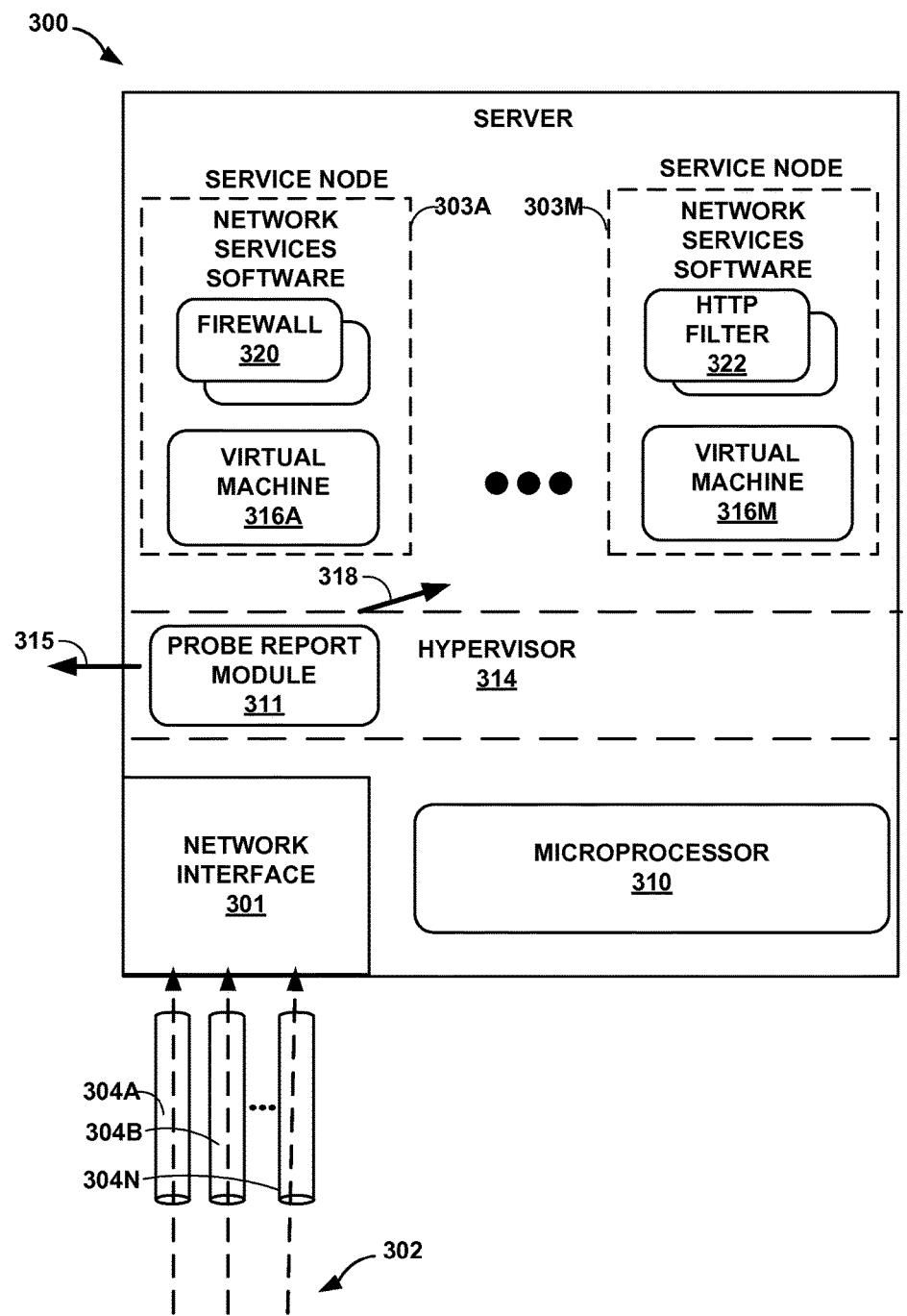
FIG. 9 is a block diagram illustrating an example server network device in accordance with the techniques of this disclosure.

FIG. 9 is a block diagram illustrating an example server 300 that provides an operating environment for one or more service nodes 303A-303M ("service nodes 303"). In this example, server 300 includes a network interface 301 to receive tunnel packets 302 over a plurality of tunnels 304A-304N ("tunnels 304"). Each of the tunnels 304 corresponds to different one of a plurality of service chains, where each of the service chains comprises a different ordered set of one or more stateful network services to be applied to packet flows associated with subscribers. Each of the tunnel packets 302 encapsulates a subscriber packet. In some cases, the subscriber packet may be a probe packet injected by a network device such as data center border router 8 (FIG. 1).

In the example of FIG. 9, server 300 includes a microprocessor 310 executing hypervisor 314 to provide an execution environment for one or more virtual machines 316A-316M ("virtual machines 316") that provide termination points for tunnels 304. Each of the virtual machines execute network services software applications, such as firewall instance 320 and HTTP filter instance 322, to apply one or more of the stateful network services to the packet flows.

Probe report module 311 executes within hypervisor 314 to process received probe packets and report information from the probe packets to the SDN controller. Although illustrated as executing within hypervisor 314, in some examples probe report module 311 may reside on one of virtual machines 316. For example, in response to detecting that one of service nodes 303 as received a probe packet, the service node 303 can in some examples provide the probe packet to probe report module 311, which in turn may send a message 315 to a central SDN controller, where the message 315 includes information obtained based on the probe packet. In some examples, one of virtual machines 316 may receive a probe packet and provide the probe packet to probe remote module 311.

In some examples, a network services software application firewall instance 320 and HTTP filter instance 322 may receive a probe packet and provide the probe packet to probe report module 311. In some examples, probe report module 311 will send message 315 to the central SDN controller using a communications protocol such as Extensible Messaging and Presence Protocol (XMPP), for example. In these and other examples, probe report module 311 may send message 315 to a different virtual routing and forwarding (VRF) instance of DC border router 8 for analysis by probe module 90 (FIG. 7) of DC border router 8.

In some examples, probe report module 311 may itself be configured to inject original probe packets within server 300 at or near hypervisor 314. The injected probe packets can be received by network services software (e.g., a service applet or daemon) of one of service nodes 303, for example, and the network services software can modify the probe packet and forward (or a virtual machine 316 can forward) the modified packet back to probe report module 311.

In these and other examples, probe report module 311 may send an internal message 318 to a virtual machine of server 300 such as virtual machine 316M with information obtained based on the probe packet, and virtual machine 316M may analyze the information from one or more of network services and other network elements internal to server 300 that have received the probe packet at different times. By analyzing packets with timestamp information from several network elements of server 300, the central SDN controller and/or virtual machine 316M can gain information regarding latency and delay within server 300. Examples of an analytics virtual machine can be found in U.S. application Ser. No. 13/840,657, filed Mar. 15, 2013, entitled "FINDING LATENCY THROUGH A PHYSICAL NETWORK IN A VIRTUALIZED NETWORK," the entire contents of which are incorporated by reference herein.

Messages 315, 316 may include an identifier of the network element sending the message, and one or more timestamps, such as data from timestamp fields 48 of a probe message 30 (FIG. 2), including a timestamp indicating a time an original packet was processed by the network element sending the message, for example. The timestamp information may be based on a networking protocol for clock synchronization between computer systems, such as Network Time Protocol (NTP) or Precision Time Protocol. Along with the pure Timestamp information, each injecting element can automatically add information about itself, such as Probe type 40, Port/Interface ID 42, Probe ID 44 (FIG. 2) which the Controller then uses for its reporting.

In some examples, a network element providing analysis of probe report information, such as a central controller, DC border router 8, or virtual machine 316, can send a response message based on the analysis, with information pertaining to the analysis and/or to change configuration of server 300 based on the analysis. In some examples, probe report module 311 of server 300 can receive the response message. In other examples, probe module 90 of DC border router 8 can receive the response message. In this manner, DC border router 8 or server 300 can address problems identified with performance of any network elements of server 300.

Figure 10:
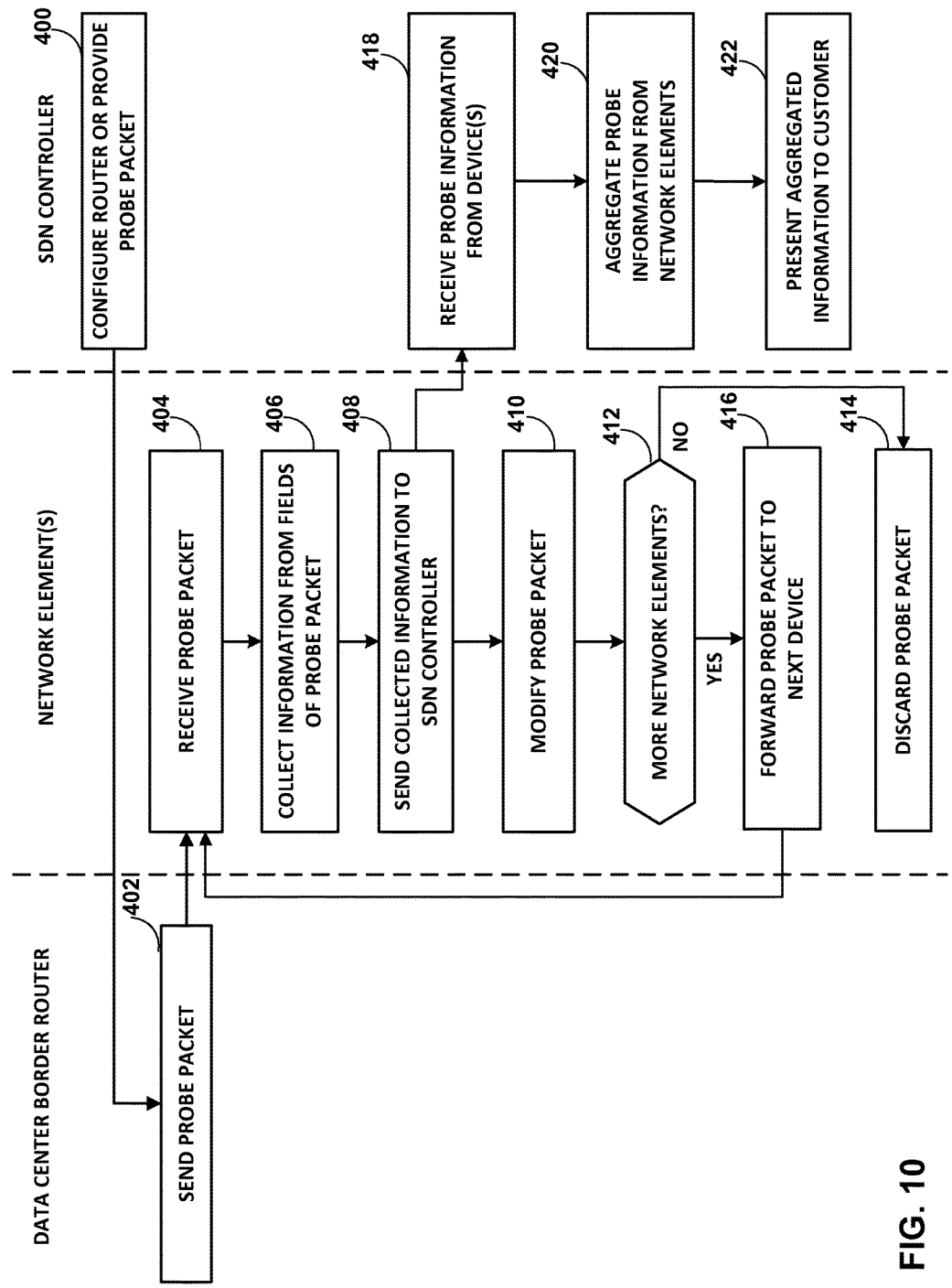
FIG. 10 is a flowchart illustrating an example mode of operation of network devices in accordance with the techniques of this disclosure.

FIG. 10 is a flowchart illustrating an example mode of operation of network devices in accordance with the techniques of this disclosure. For purposes of explanation, the example mode of operation is described with respect to data center border router 8, various intermediate network elements, and SDN controller 14 of FIG. 1. Although either of CE router 18 or DC border router 8 can perform the techniques of FIG. 10, FIG. 10 will be described for purposes of example with respect to DC border router 8.

SDN controller 14 can configure DC border router 8 to send probe packets for measuring performance of a forwarding path through data center 9 (400). For example, SDN controller 14 can send a configuration message 19B to DC border router 8. In some examples, configuration message 19B may provide a probe packet generated by SDN controller 400. In response to receiving the configuration message 19B from SDN controller 400, DC border router 8 can send a probe packet according to the configuration (402). In some examples, DC border router 8 may send periodic probe packets along the same forwarding path. In some examples, DC border router 8 may send probe packets along different forwarding paths to test the different forwarding paths.

A network element along forwarding path 28 can receive the probe packet (404). A network element can be, for example, a DC border router, a service node, a virtual router, or an application, for example. For example, service node 10A may receive the probe packet, and a probe report module associated with a virtual router of service node 10A can determine that the packet is a probe packet that contains. The probe report module can be probe report module 311 of server 300 (FIG. 9), for example. The probe packet may be formatted in a manner similar to that of probe packet 30 of FIG. 2. Based on the determination, the probe report module can collect information from one or more fields of the probe packet (406). For example, the probe report module can collect information from timestamp fields 157, and/or other fields of the probe packet. The probe report module can send the collected information to SDN controller 14 (408), such as by message 315 (FIG. 9).

In some examples, the probe report module may also modify the probe packet (410), such as by inserting additional timestamp information to the timestamp field. The network element can determine whether there are any more network elements on a forwarding path to which to forward the packet (412). If there are no more network elements (NO branch of 412), the network element may discard the probe packet (414). If there are additional network elements to which to forward the packet, the network element can forward the probe packet to the next network device (416).

The process may then repeat with the next network element. Network elements may be any network elements along the service tunnel forwarding path, such as a Physical Switch, Physical Router, Hypervisor Element like a linuxbridge, virtual Switch, and/or virtual Router, a Guest VM Forwarding element virtual Switch or Guest VM Forwarding element Router, a Guest Application/Service, or a Packet Reflector, for example.

SDN controller 14 receives the probe information from the respective network element(s) (418), e.g., via message 315, and may store the probe information. SDN controller 14 can aggregate all of the probe information received from multiple network elements along a given forwarding path (420). SDN controller 14 may perform the aggregation based on fields of the probe packets, such as port/interface ID field 42 and/or probe identifier field 44, for example. SDN controller 14 can present the aggregated information to a customer, such as a service provider or network operator, e.g., by outputting a report 11 (FIG. 1).

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various aspects of this disclosure have been described. These and other aspects are within the scope of the following claims.

What is claimed is:

1. A method comprising:
   injecting, by a network device external to a services complex of a data center having a plurality of service nodes, a first plurality of probe packets along service chains provided by the services complex,
   wherein each of the service chains comprises a different ordered combination of network services applied to packets received by the service nodes, and wherein each of the first plurality of probe packets includes a first timestamp indicating a time at which the network device sent the respective probe packet, and overlay encapsulation with header information relating to a transport tunnel and tenant identification associated with a tenant enterprise network or a tenant public network configured for forwarding packets of a particular customer of the data center;
   by one or more of the plurality of service nodes in the services complex, modifying each of the first plurality of probe packets by inserting a respective second timestamp indicating a respective time at which the respective service node processed the respective one of the first plurality of probe packets and applying the network services to the modified probe packets according to the respective service chains;
   aggregating, by an analytics device, separate from the plurality of service nodes, probe report information received from each of the plurality of service nodes to determine one or more path monitoring metrics associated with service level agreements of customers of the data center;
   identifying, by the analytics device and based on the probe report information, a component in a service node of the plurality of service nodes that is not receiving probe packets along one of the service chains;
   in response to identifying the component, configuring a probe packet injector at a virtual router component of the service node having the component; and
   injecting, by the probe packet injector of the virtual router component, a second plurality of probe packets for forwarding, by the service node having the component, along a remaining portion of the service chain that includes the component.

2. The method of claim 1, wherein the one or more path monitoring metrics comprise one or more of metrics regarding healthchecks, performance loss, jitter, or latency within a network.

3. The method of claim 1, further comprising:
   in response to receiving the probe packets and by each of the plurality of service nodes, reporting the probe report information to the analytics device, wherein the probe report information comprises at least information relating to the first timestamp and the respective second timestamp.

4. The method of claim 1, wherein each packet of the first plurality of probe packets and the second plurality of probe packets comprises an Internet Control Message Protocol (ICMP) packet, and wherein modifying the probe packets comprises adding the timestamp entry to the timestamp field in place of padding data.

5. The method of claim 1, wherein the analytics device comprises a central network controller device.

6. The method of claim 1, wherein the network device comprises a data center border router, and wherein the analytics device comprises an analytics function on the data center border router that originated the packet.

7. The method of claim 1, wherein modifying the probe packets comprises modifying the probe packets by one or more of a physical switch, a virtual router, or a virtual switch of a service node of the plurality of service nodes.

8. The method of claim 1, wherein the network device comprises a data center border router positioned at a border of the service complex and a service provider network external to the service complex.

9. The method of claim 1, wherein the network device comprises a customer edge router positioned at a border of an access network and a service provider network external to the service complex.

10. The method of claim 1, further comprising generating the first plurality of probe packets such that at least some of the plurality of probe packets have different source Internet Protocol (IP) addresses to direct the probe packets to different service virtual machines along different service chains within the service complex.

11. The method of claim 1, wherein each packet of the first plurality of probe packets and the second plurality of probe packets comprises: a Uniform Datagram Protocol (UDP) packet having the first timestamp in a UDP options field, or a plurality of Transmission Control Protocol (TCP) packet having the first timestamp in a TCP options field.

12. The method of claim 1,
wherein injecting the first plurality of probe packets comprises injecting the plurality of probe packets using a virtual routing and forwarding instance (VRF) other than a VRF configured for forwarding packets of the particular customer.

13. A system comprising:
a services complex of a data center, the services complex comprising a plurality of service nodes;
a border router external to the services complex, wherein the border router is configured to inject a first plurality of probe packets along service chains provided by the service complex, wherein each of the service chains comprises a different ordered combination of network services applied to packets received by the service nodes, wherein each of the first plurality of probe packets includes a first timestamp indicating a time at which the border router sent the respective probe packet and overlay encapsulation with header information relating to a transport tunnel and tenant identification associated with a tenant enterprise network or a tenant public network configured for forwarding packets of a particular customer of the data center;
wherein one or more of the plurality of service nodes is configured to modify each of the first plurality of probe packets by inserting a respective second timestamp indicating a respective time at which the respective service node processed the respective one of the first plurality of probe packets, and apply the network services to the modified probe packets according to the respective service chains; and
a central controller device configured to aggregate probe report information received from each of the plurality of service nodes to determine one or more path monitoring metrics associated with service level agreements of customers of the data center, identify, based on the probe report information, a component in a service node of the plurality of service nodes that is not receiving probe packets along one of the service chains, and, in response to identifying the component, configure a probe packet injector at a virtual router component of the service node having the component,
wherein the probe packet injector of the virtual router component injects a second plurality of probe packets for forwarding, by the service node having the component, along a remaining portion of the service chain that includes the component.

* * * * *